(12) United States Patent
Vezina et al.

(10) Patent No.: US 10,293,885 B2
(45) Date of Patent: May 21, 2019

(54) TUNNEL GUARD FOR A SNOWMOBILE

(71) Applicant: BOMBARDIER RECREATIONAL PRODUCTS INC., Valcourt (CA)

(72) Inventors: Sebastien Vezina, Sherbrooke (CA); Jean-Simon Lavallee, Sherbrooke (CA)

(73) Assignee: BOMBARDIER RECREATIONAL PRODUCTS INC., Valcourt (CA)

(*) Notice: Subject to any disclaimer, the term of this patent is extended or adjusted under 35 U.S.C. 154(b) by 407 days.

(21) Appl. No.: 14/953,157

(22) Filed: Nov. 27, 2015

(65) Prior Publication Data

US 2016/0152304 A1 Jun. 2, 2016

Related U.S. Application Data

(60) Provisional application No. 62/085,306, filed on Nov. 27, 2014.

(51) Int. Cl.
 *B62M 27/02* (2006.01)
 *B60K 11/00* (2006.01)
 (Continued)

(52) U.S. Cl.
 CPC ............. *B62M 27/02* (2013.01); *B60K 11/00* (2013.01); *B62B 13/06* (2013.01); *B62B 17/06* (2013.01); *B60K 11/04* (2013.01); *B60Y 2200/252* (2013.01); *B62M 2027/026* (2013.01); *B62M 2027/028* (2013.01)

(58) Field of Classification Search
 CPC ............ B62M 27/02; B62M 2027/026; B62M 2027/028; B62B 13/00; B60K 11/00; B60Y 2200/252
 See application file for complete search history.

(56) References Cited

U.S. PATENT DOCUMENTS 1,751,252 A * 3/1930 Schubert ................ B62M 27/02
  280/12.11
3,901,335 A * 8/1975 Johnson ................ B60K 11/02
  180/182

(Continued)

OTHER PUBLICATIONS

Bombardier Recreational Products Inc. and BRP US Inc., Instruction Sheet P/N 487 800 400, Tunnel Protector (Kit P/N 860 200 381), 2009, Canada.

(Continued)

*Primary Examiner* — Joseph M Rocca
*Assistant Examiner* — Maurice L Williams
(74) *Attorney, Agent, or Firm* — BCF LLP

(57) ABSTRACT

A tunnel guard for a tunnel of a snowmobile has first and second arms. Each arm has a first end portion and a second end portion. The first end portions of the first and second arms have first and second connection elements respectively for connecting the first end portions of the arms to an interior of the tunnel. At least one member extends from at least one of the arms and is connected to the at least one of the arms. The at least one member has a third connection element for connecting the at least one member to the interior of the tunnel. The third connection element is disposed at a position that is one of: laterally between the first and second arms, and laterally outward of the first and second arms. A snowmobile having a tunnel guard and a method for connecting a tunnel guard are also disclosed.

23 Claims, 30 Drawing Sheets

(51) Int. Cl.
*B62B 17/06* (2006.01)
*B62B 13/06* (2006.01)
*B60K 11/04* (2006.01)

(56) References Cited

U.S. PATENT DOCUMENTS

| | | | | |
|---|---|---|---|---|
| 5,568,840 | A * | 10/1996 | Nagata | B62M 27/02 |
| | | | | 180/190 |
| 7,328,765 | B2 * | 2/2008 | Ebert | B62D 25/161 |
| | | | | 180/186 |
| 7,779,944 | B2 * | 8/2010 | Bergman | B60K 11/04 |
| | | | | 180/190 |
| 8,381,857 | B1 * | 2/2013 | Sampson | B62M 27/00 |
| | | | | 180/190 |
| 2003/0150658 | A1 * | 8/2003 | Nakano | B62M 27/02 |
| | | | | 180/190 |
| 2006/0175107 | A1 * | 8/2006 | Etou | B62M 27/02 |
| | | | | 180/190 |
| 2009/0255745 | A1 * | 10/2009 | Kukowski | B62M 27/02 |
| | | | | 180/190 |
| 2011/0186371 | A1 * | 8/2011 | Berg | B60K 11/04 |
| | | | | 180/190 |

OTHER PUBLICATIONS

Bombardier Recreational Products and BRP US Inc., Instruction Sheet P/N 487 801 144, Inc. Tunnel Protector (Kit P/N 860 200 802), Revision 2, Mar. 2015, Canada.

* cited by examiner

TUNNEL GUARD FOR A SNOWMOBILE

CROSS-REFERENCE

The present application claims priority to U.S. Provisional Patent Application No. 62/085,306, filed Nov. 27, 2014, the entirety of which is incorporated herein by reference.

FIELD OF TECHNOLOGY

The present technology relates to a tunnel guard for snowmobiles.

BACKGROUND

The frame of a snowmobile has a tunnel. Typically, the tunnel defines footrests, a seat of the snowmobile is disposed above the tunnel and a drive track propelling the snowmobile is disposed at least in part below the tunnel. The drive track is disposed around a rear suspension assembly. The drive track has a belt with a plurality of external lugs extending from an outer surface of the belt. In order to increase traction, some tracks are additionally provided with metallic studs protruding from the outer surface of the belt.

As the snowmobile operates, the rear suspension assembly compresses, expands and pivots relative to the tunnel. As would be understood, as a result of the movement of the rear suspension assembly, in addition to turning around the rear suspension assembly, the drive track moves relative to the tunnel with the rear suspension assembly.

Under some conditions, it may be possible for the rear suspension assembly to move to a position relative to the tunnel that results in the external lugs and the studs (should studs be provided) of the track to come into contact with the underside of the tunnel. This could potentially damage the tunnel.

This problem is exacerbated in tunnels defining a heat exchanger assembly through which a motor fluid, such as engine coolant or lubricant, flows to be cooled by air flowing over the tunnel and the snow projected by the track onto the tunnel. In such tunnels, should the external lugs or the studs come into contact with the portion of the tunnel defining the heat exchanger assembly, the external lugs or the studs could pierce that portion of the tunnel, resulting in loss of the motor fluid. As would be understood, loss of this motor fluid could potentially result in damages to components of the snowmobile other than the tunnel. For example, should the motor fluid be engine coolant, loss of the coolant could lead to overheating of the engine which could damage the engine.

Another solution to the above problem consists in moving the drive track and the tunnel further away from each other. However, this would raise the center of gravity of the snowmobile. As a result, the stability and handling characteristics of the snowmobile could be affected.

Accordingly, it would be desirable to have a snowmobile in which the drive track is prevented from coming in contact with the bottom portion of the tunnel.

SUMMARY

It is an object of the present technology to ameliorate at least some of the inconveniences present in the prior art.

The present technology provides a tunnel guard connected to the interior portion of the tunnel. The tunnel guard is located such that as the track moves toward the bottom portion of the tunnel, the track comes into contact with the tunnel guard before it can contact the bottom portion of the tunnel. As a result, the tunnel guard protects the tunnel from contacts with the drive track.

In some implementations of the present technology, the tunnel guard is configured so as to shield portions of the tunnel defining a fluid passage of a heat exchanger assembly forming part of the tunnel. The tunnel guard is also configured so as to connect to portions of the tunnel that do not define this passage.

According to some aspects of the present technology, there is provided a tunnel guard for a tunnel of a snowmobile having a first arm and a second arm. The first arm has a first end portion and a second end portion. The first end portion has a first connection element configured for connecting the first end portion of the first arm to an interior of the tunnel. The second arm has a first end portion and a second end portion. The first end portion has a second connection element configured for connecting the first end portion of the second arm to the interior of the tunnel. At least one member extends from at least one of the first and second arms and is connected to the at least one of the first and second arms. The at least one member has a third connection element for connecting the at least one member to the interior of the tunnel. The third connection element is disposed at a position that is one of: laterally between the first and second arms, and laterally outward of the first and second arms.

In some implementations of the present technology, the at least one member is a cross-member extending between the first and second arms and connected to the first and second arms.

In some implementations of the present technology, the third connection element is disposed laterally between the first and second arms.

In some implementations of the present technology, the first arm is parallel to the second arm and the cross-member is perpendicular to the first and second arms.

In some implementations of the present technology, the first end portions of the first and second arms are rear end portions.

In some implementations of the present technology, the third connection element is a tongue configured to be received in a groove formed by the tunnel.

In some implementations of the present technology, the tongue extends toward the first end portions of the first and second arms.

In some implementations of the present technology, the tongue is centered laterally between the first and second arms.

In some implementations of the present technology, the third connection element includes a laterally centered aperture configured to receive a fastener therethrough.

In some implementations of the present technology, a portion of the cross-member having the third connection element is spaced from bottom surfaces of the first and second arms.

In some implementations of the present technology, the portion of the cross-member having the third connection element is spaced from a plane containing top surfaces of the second end portions of the first and second arms.

In some implementations of the present technology, the first end portion of the first arm defines a first tab extending laterally away from the second arm. The first tab has the first connection element. The first end portion of the second arm defines a second tab extending laterally away from the first arm. The second tab has the second connection element.

In some implementations of the present technology, portions of the first end portions of the first and second arms having the first and second connection elements are spaced from a plane containing top surfaces of the second end portions of the first and second arms.

In some implementations of the present technology, the first and second connection elements each include a plurality of resilient tabs, each tab having an outwardly extending detent.

In some implementations of the present technology, the cross-member extends between the second end portions of the first and second arms and is connected to the second end portions of the first and second arms.

According to another aspect of the present technology, there is provided a snowmobile having a frame. The frame has a tunnel. At least a portion of the tunnel is formed by a heat exchanger assembly adapted to have a motor fluid flowing therethrough for cooling the at least one motor fluid. The heat exchanger assembly has a top part and a bottom part disposed below the top part and being joined to the top part. The bottom parts defines a recess. The top and bottom parts define therebetween a passage formed in part by the recess. The motor fluid flows through the passage. The snowmobile also has a motor supported by the frame, at least one ski connected to the frame, a rear suspension assembly connected to the tunnel, and a drive track disposed around the rear suspension assembly and at least in part below the tunnel. The drive track is operatively connected to the motor. The snowmobile also has a tunnel guard connected to an interior of the tunnel and disposed between the drive track and the tunnel. The tunnel guard is disposed at least in part under the passage of the heat exchanger assembly.

In some implementations of the present technology, the passage has a right passage portion extending longitudinally along a right side of the tunnel and a left passage portion extending longitudinally along a left side of the tunnel. The tunnel guard has a right arm extending at least in part along the right passage portion and a left arm extending at least in part along the left passage portion. The right arm has a rear end portion and a front end portion. The rear end portion has a right connection element connected to the interior of the tunnel. The left arm has a rear end portion and a front end portion. The rear end portion has a left connection element connected to the interior of the tunnel. The tunnel guard also has at least one member extending from at least one of the right and left arms and connected to the at least one of the right and left arms. The at least one member has a connection element for connecting the at least one member to the interior of the tunnel. The connection element is disposed at a position that is one of: laterally between the right and left passage portions, and laterally outward of the right and left passage portions.

In some implementations of the present technology, the at least one member is a cross-member extending between the first and second arms and connected to the first and second arms.

In some implementations of the present technology, the connection element is a central connection element disposed laterally between the right and left passage portions.

In some implementations of the present technology, the drive track has a belt, and a plurality of external lugs distributed on an outer side of the belt. At least some of the plurality of external lugs form a right longitudinal row of lugs and a left longitudinal row of lugs. The right arm of the tunnel guard is laterally aligned with at least a portion of the right longitudinal row of lugs. The left arm of the tunnel guard is laterally aligned with at least a portion of the left longitudinal row of lugs.

In some implementations of the present technology, the drive track also has a plurality of studs distributed on at least one of an outer side of the belt and at least some of the plurality of external lugs. At least some of the plurality of studs are disposed laterally between the right and left arms.

In some implementations of the present technology, the right arm is parallel to the left arm, and the cross-member is perpendicular to the right and left arms.

In some implementations of the present technology, the central connection element is a tongue extending rearward. The tunnel defines a groove laterally between the right and left passage portions. The tongue is received in the groove.

In some implementations of the present technology, the central connection element includes a first laterally centered aperture disposed laterally between the right and left passage portions and a fastener extending through the first laterally centered aperture. The tunnel defines a second laterally centered aperture aligned with the first laterally centered aperture. The fastener extends through the second laterally centered aperture. The fastener fastens the cross-member to the tunnel.

In some implementations of the present technology, a portion of the cross-member having the connection element is vertically higher than bottom surfaces of the first and second arms.

In some implementations of the present technology, the portion of the cross-member having the connection element is vertically higher than the front end portions of the right and left arms.

In some implementations of the present technology, portions of the rear end portions of the right and left arms having the right and left connection elements are vertically higher than the front end portions of the right and left arms.

In some implementations of the present technology, the cross-member extends between the front end portions of the right and left arms and is connected to the front end portions of the right and left arms.

According to another aspect of the present technology, there is provided a method for connecting a tunnel guard to an interior of a tunnel of a snowmobile. The method comprises: connecting a front portion of the tunnel guard to the interior of the tunnel; after connecting the front portion of the tunnel guard, connecting the rear portion of the tunnel guard to the interior of the tunnel. The front portion of the tunnel guard is connectable to the interior of the tunnel only by being connected to the interior of the tunnel prior to the rear portion of the tunnel guard.

In some implementations of the present technology, the tunnel guard has a rearwardly extending tongue and the tunnel has a groove opening forwardly. Connecting the front portion of the tunnel guard to the interior of the tunnel includes moving the tunnel guard rearward to insert the tongue in the groove.

In some implementations of the present technology, the tunnel has a heat exchanger. The heat exchanger has a passage for motor fluid. The passage has a right passage portion and a left passage portion. Connecting the front portion of the tunnel guard to the interior of the tunnel includes connecting the front portion of the tunnel guard to the tunnel at a position laterally between the right and left passage portions.

For purposes of this application, terms related to spatial orientation such as forwardly, rearward, upwardly, downwardly, left, and right, are as they would normally be understood by a driver of the snowmobile sitting thereon in a normal riding position. Terms related to spatial orientation when describing or referring to components or sub-assemblies of the snowmobile, separately from the snowmobile, such as a tunnel guard for example, should be understood as they would be understood when these components or subassemblies are mounted to the snowmobile, unless specified otherwise in this application.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
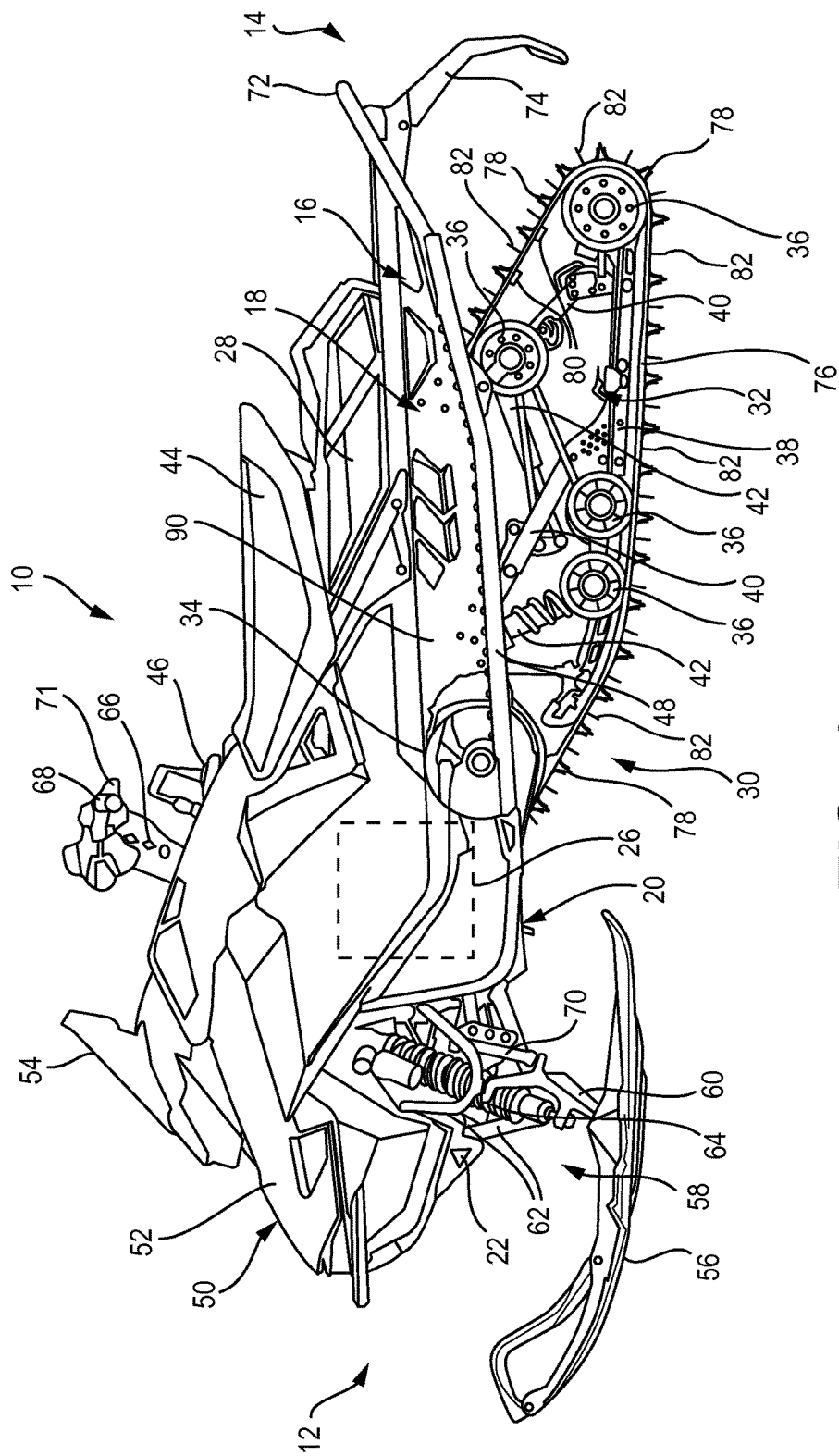
FIG. 1 is a left side elevation view of a snowmobile.
Figure 2:
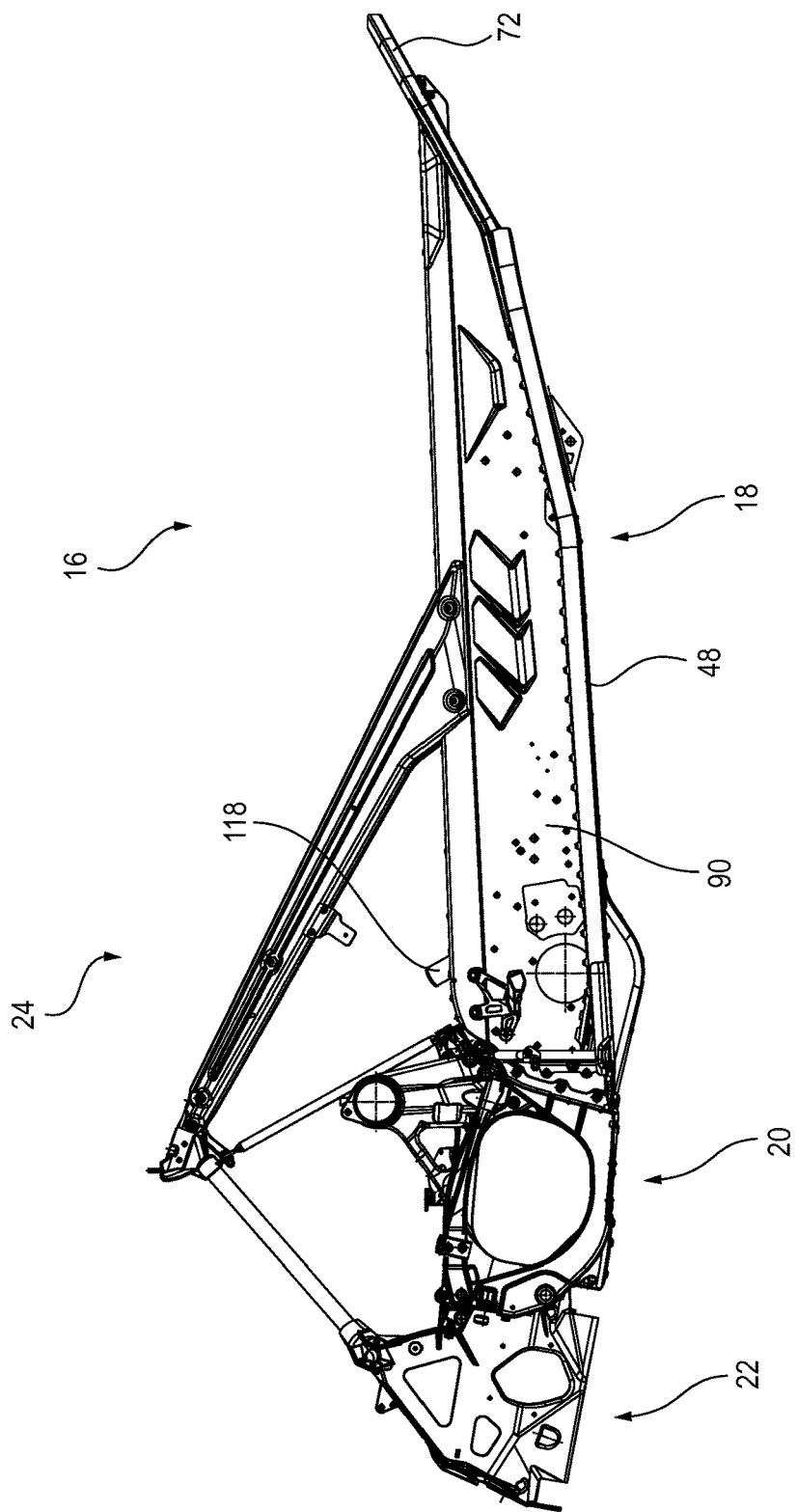
FIG. 2 is a left side elevation view of a frame of the snowmobile of FIG. 1.
Figure 3:
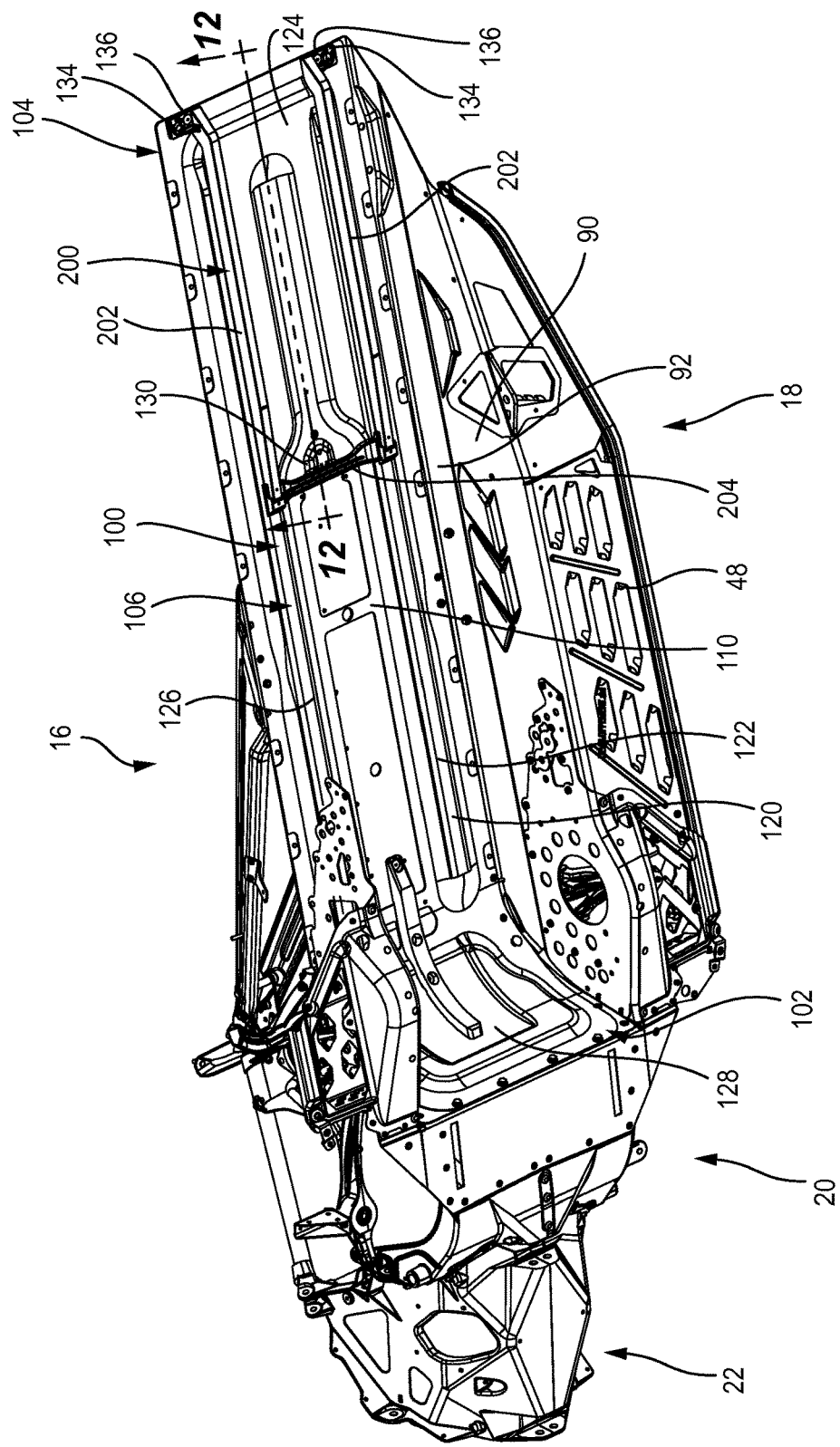
FIG. 3 is a bottom perspective view taken from a rear, left side of the frame of FIG. 2 with portions of the frame removed for clarity.

Referring to FIG. 1, a snowmobile 10 includes a forward end 12 and a rearward end 14. The snowmobile 10 includes a vehicle body in the form of a frame or chassis 16 which, as can be seen in FIGS. 2 and 3, includes a tunnel 18, an engine cradle portion 20, a front suspension module 22 and an upper structure 24.

A motor 26 (schematically illustrated in FIG. 1), which in the illustrated implementation is an internal combustion engine, is carried in an engine compartment defined in part by the engine cradle portion 20 of the frame 16. A fuel tank 28, supported above the tunnel 18, supplies fuel to the engine 26 for its operation. Coolant used to cool the engine 26 is circulated through a heat exchanger assembly 100 (FIG. 3), described in greater detail below, to be cooled. The heat exchanger assembly 100 forms part of the tunnel 18.

An endless drive track 30 is disposed generally under the tunnel 18. The drive track 30 is operatively connected to the engine 26 through a belt transmission system (not shown) and a reduction drive (not shown). The endless drive track 30 is driven to run about a rear suspension assembly 32 connected to the frame 16 for propulsion of the snowmobile 10. The drive track 30 will be described in greater detail below.

The rear suspension assembly 32 includes drive sprockets 34, idler wheels 36 and a pair of slide rails 38 in sliding contact with the endless drive track 30. The drive sprockets 34 are mounted on a drive axle (not shown). The slide rails 38 are attached to the tunnel 18 by front and rear suspension arms 40 and shock absorbers 42. It is contemplated that the snowmobile 10 could be provided with a different implementation of a rear suspension assembly 32 than the one shown herein.

A straddle-type seat 44 is positioned atop the fuel tank 28. A fuel tank filler opening covered by a cap 46 is disposed on the upper surface of the fuel tank 28 in front of the seat 44. It is contemplated that the fuel tank filler opening could be disposed elsewhere on the fuel tank 28. The seat 44 is configured to accommodate a driver of the snowmobile 10. The seat 44 could also be configured to accommodate a passenger. A footrest 48 is positioned on each side of the snowmobile 10 below the seat 44 to accommodate the driver's feet.

At the front end 12 of the snowmobile 10, fairings 50 enclose the engine 26 and the belt transmission system, thereby providing an external shell that not only protects the engine 26 and the transmission system, but can also make the snowmobile 10 more aesthetically pleasing. The fairings 50 include a hood 52 and one or more side panels which can be opened to allow access to the engine 26 and the belt transmission system when this is required, for example, for inspection or maintenance of the engine 26 and/or the transmission system. A windshield 54 connected to the fairings 50 acts as a wind screen to lessen the force of the air on the driver while the snowmobile 10 is moving.

Two skis 56, only a left one of which is shown in the figures, are positioned at the forward end 12 of the snowmobile 10 and are attached to the front suspension module 22 of the frame 16 through a front suspension assembly 58. The front suspension module 22 is connected to the front end of the engine cradle portion 20. The front suspension assembly 58 includes ski legs 60, supporting arms 62, ball joints and shock absorbers 64.

A steering assembly, including a steering column 66 and a handlebar 68, is provided generally forward of the seat 44. The steering column 66 is rotatably connected to the frame 16. The lower end of the steering column 66 is connected to the ski legs 60 via steering rods 70. The handlebar 68 is attached to the upper end of the steering column 66. The handlebar 68 is used to rotate the steering column 66, and thereby the skis 56, in order to steer the snowmobile 10. A throttle operator in the form of a thumb-actuated throttle lever 71 is mounted to the right side of the handlebar 68. Other types of throttle operators, such as a finger-actuated throttle lever and a twist grip, are also contemplated. A brake actuator (not indicated), in the form of a hand brake lever, is provided on the left side of the handlebar 68 for braking the snowmobile 10 in a known manner. It is contemplated that the windshield 54 could be connected directly to the handlebar 68.

At the rear end of the snowmobile 10, a rear bumper 72 is connected to the sides of the tunnel 18 and extends rearward and upward of the tunnel 18. A snow flap 74 extends downward from the rear end of the tunnel 18. The snow flap 74 protects against dirt and snow that can be projected upward from the drive track 30 when the snowmobile 10 is being driven. It is contemplated that the snow flap 74 could be omitted.

The snowmobile 10 includes other components such as a display cluster, an exhaust system, an air intake system, and the like. As it is believed that these components would be readily recognized by one of ordinary skill in the art, further explanation and description of these components will not be provided herein.

Figure 15:
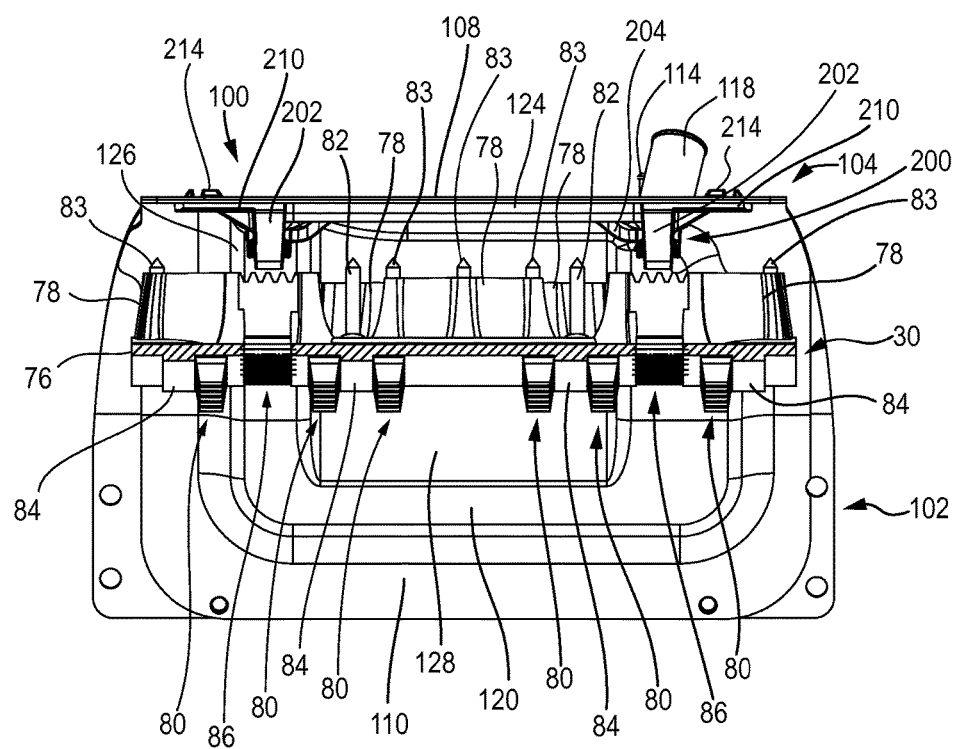
FIG. 15 is a rear elevation view of the heat exchanger assembly and tunnel guard of FIG. 4 with a portion of a drive track of the snowmobile of FIG. 1.
Figure 16:
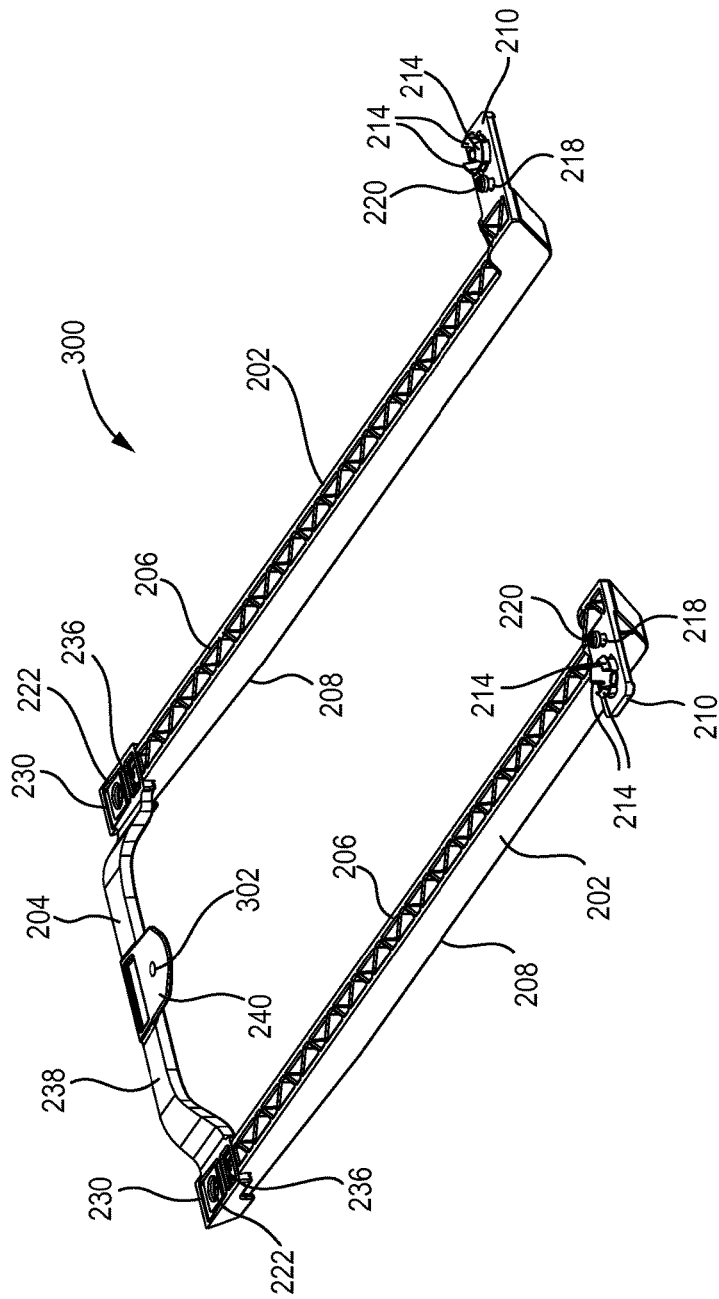
FIG. 16 is a top perspective view taken from a rear, left side of an alternative implementation of a tunnel guard.
Figure 17:
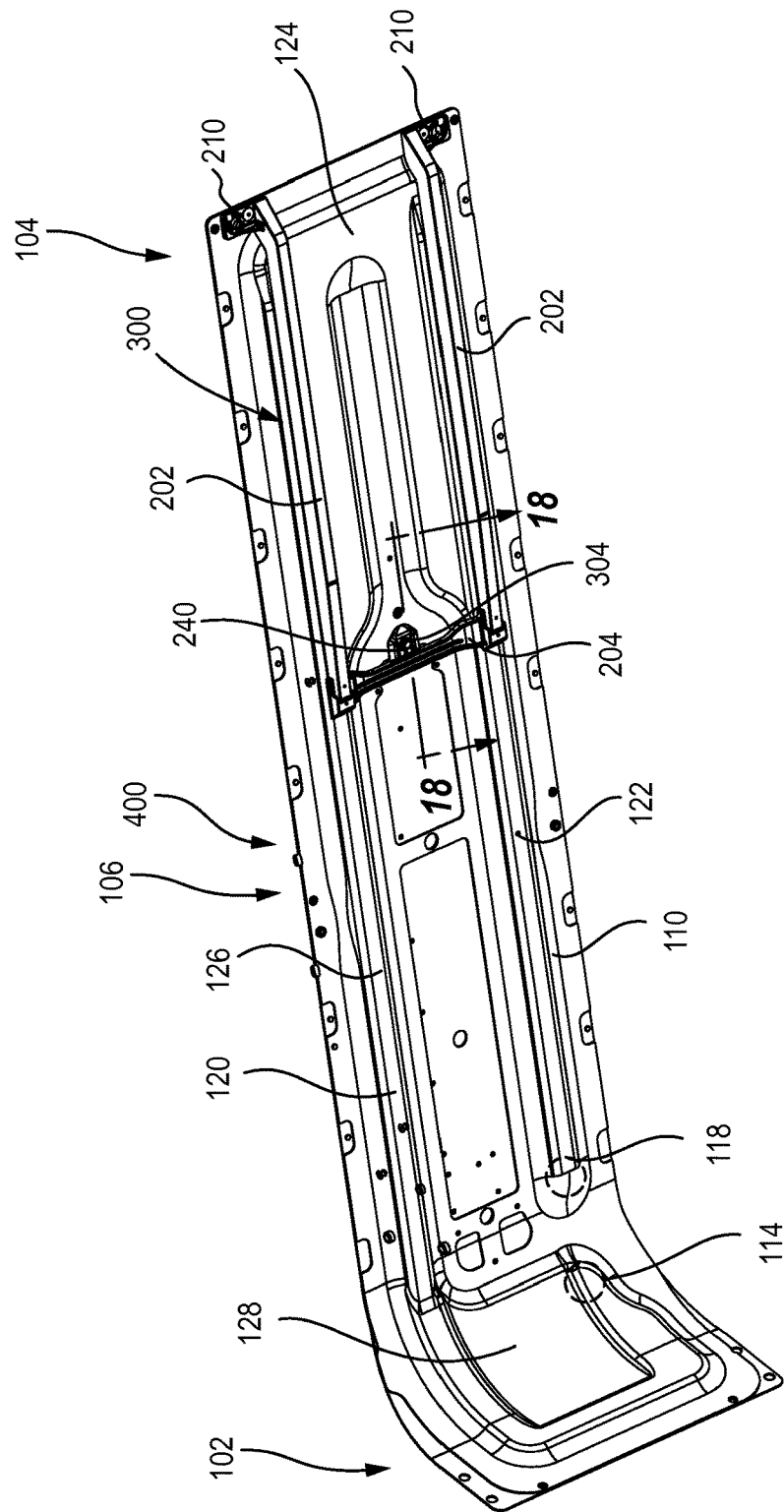
FIG. 17 is a bottom perspective view taken from a rear, left side of an alternative implementation of the heat exchanger assembly of FIG. 4 with the tunnel guard of FIG. 16 connected to a bottom of the heat exchanger assembly.

Turning now to FIGS. 1 and 15, the drive track 30 will be described in more detail. The endless drive track 30 has an endless flexible belt 76, a plurality of external lugs 78 (only some of which are labeled) that project outwardly from an outer surface of the belt 76 and a plurality of internal lugs 80 (only some of which are labeled) that project inwardly from an inner surface of the belt 76. The endless drive track 30 is also provided with a plurality of metal studs 82 (only some of which are labeled) that project outwardly from an outer surface of the belt 76 and a plurality of metal studs 83 (only some of which are labelled) that project outwardly from the ends of the plurality of external lugs 78. It is contemplated that the studs 82, 83 could be made of a material other than metal. It is also contemplated that the studs 82 and/or the studs 83 could be omitted. The plurality of external lugs 78, the plurality of studs 82 and the plurality of studs 83 provide the endless drive track 30 with traction as the drive track 30 propels the snowmobile 10. The internal lugs 80 are engaged by axial teeth (not shown) of the drive sprockets 34 so as to move the belt 76 around the suspension assembly 32. The drive track 30 also includes a number of bands 84 extending longitudinally along the inner surface of the belt 76. The bands 84 provide a surface along which the wheels 36 can roll. It is contemplated that the bands 84 could be omitted such that the wheels 36 would roll directly on the inner surface of the endless belt 76.

The endless belt 76 is made of a strong, flexible material such as rubber reinforced with fabric and metal. The endless belt 76, the external lugs 78, the internal lugs 80, and the bands 84 are integrally formed with each other.

As best seen in FIG. 15, the plurality of internal lugs 80 form six longitudinally extending rows of internal lugs. The internal lugs 80 of the six rows are aligned with each other in the longitudinal direction so as to form laterally extending rows. It is however contemplated that some or all of the internal lugs 80 could be offset from each other in the longitudinal direction. All of the internal lugs 80 are identical to each other in the implementation shown. It is contemplated however that the lugs 80 could be different from each other. Some of the internal lugs 80 are engaged by the teeth of the sprockets 34. It is also contemplated that the internal lugs 80 could be arranged in a pattern that differs from the one illustrated in the figures and/or that there could be more or less internal lugs 80 than illustrated.

The pattern of external lugs 78 consists in one laterally extending row containing two external lugs 78 disposed along the edges of the belt 76, followed by one laterally extending row containing three external lugs 78, followed by one laterally extending row containing two external lugs 78 spaced from the edges of the belt 76, and the pattern is repeated in the longitudinal direction along the entire periphery of the endless belt 76. It is contemplated that the external lugs 78 could be arranged in a pattern that differs from the one illustrated and/or that there could be more or less external lugs 78 than illustrated.

As can be seen in FIG. 15, the studs 82 are arranged in two longitudinally extending rows. The studs 82 are arrange in laterally extending rows of two studs 82. As can be seen in FIG. 1, a laterally extending row of two studs 82 is disposed between each pair of laterally extending rows of external lugs 78. It is contemplated that the studs 82 could be arranged in a pattern that differs from the one illustrated and/or that there could be more or less studs 82 than illustrated. As can also be seen in FIG. 15, the central external lug 78 shown has three studs 83 and the side external lugs 78 shown each have one stud 83. It is contemplated that more or less studs 83 than illustrated could be provided. The other external lugs 78 are also provided with studs 83 in the pattern. The studs 83 are provided in areas of increased thickness of the external lugs 78.

A plurality of longitudinally spaced apertures (or windows) 86 (FIG. 15) are defined in the endless belt 76. Each aperture 86 extends through the belt 76. The apertures 86 are disposed in two longitudinal rows. The apertures 86 are engaged by the radial sprocket teeth (not shown) of the drive sprockets 34 for moving the belt 76. The endless drive track 30 also has cleats (not shown) mounted between the apertures 86.

Reinforcement rods 88 (shown in the implementation of FIG. 19) extend laterally inside the endless belt 76. One reinforcement rod 88 is provided in alignment with each laterally extending row of external lugs 78. It is contemplated that not every laterally extending row of external lugs 78 could be provided with a reinforcement rod 88. It is also contemplated that reinforcement rods 88 could be provided longitudinally between laterally extending rows of external lugs 78. The reinforcement rods 88 are fiberglass rods, but it is contemplated that other materials could be used, such as carbon fiber or metal for example.

Turning now to FIGS. 2 and 3, the tunnel 18 will be described in more detail. The tunnel 18 has two side portions 90. Each side portion 90 is made from a bent piece of sheet metal. Each side portion has a horizontally extending top portion 92 (FIG. 3) and is bent at its bottom to form a part of the corresponding footrest 48. The heat exchanger assembly 100 rests on the top portions 92 between the side portions 90, thereby forming a majority of the top and front of the tunnel 18. The heat exchanger assembly 100 is fastened to the side portions 90.

Figure 12:
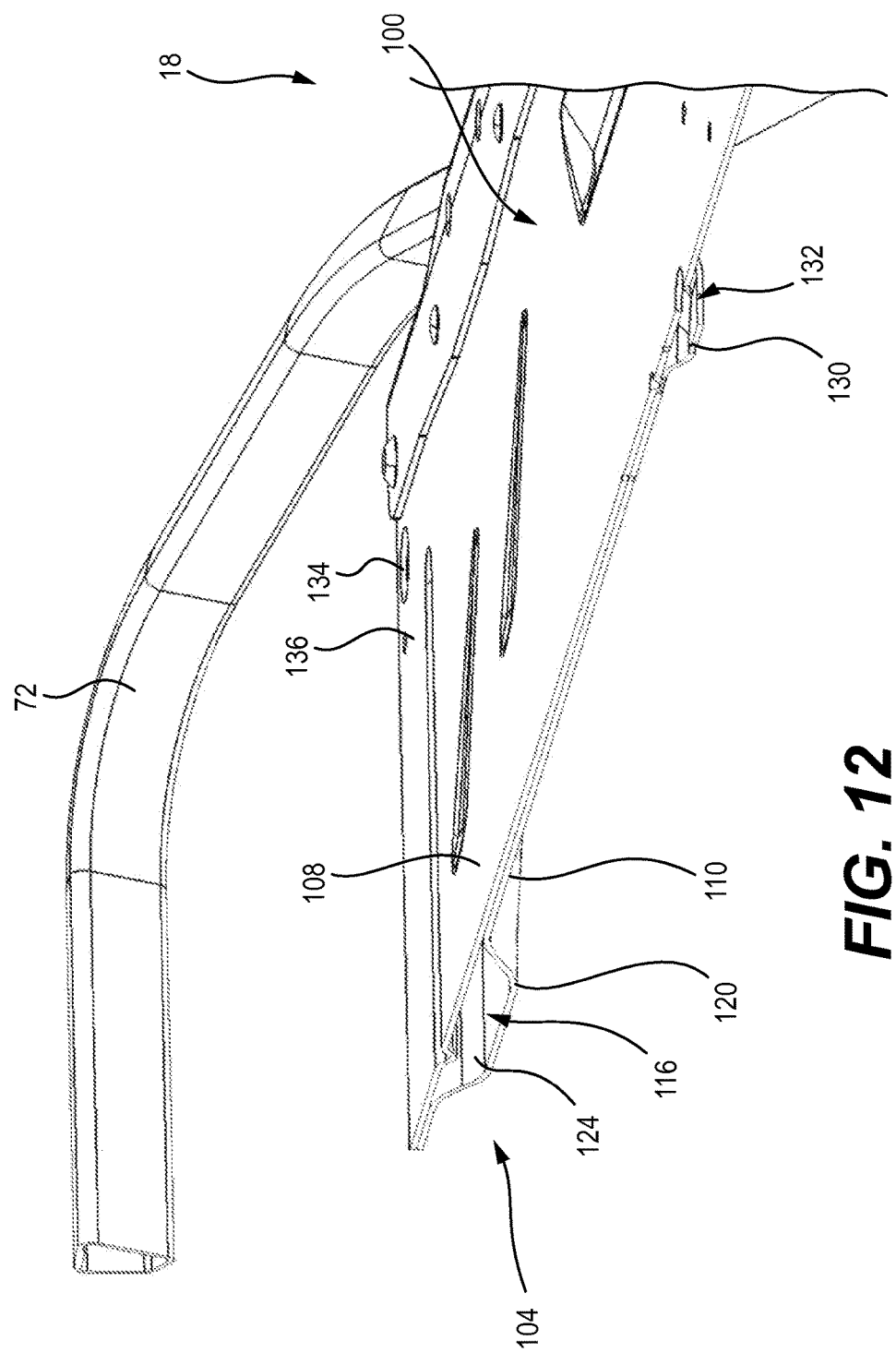
FIG. 12 is a perspective view taken from a front, right side of a cross-sectional view of the tunnel taken through line 12-12 of FIG. 3 without the tunnel guard.

Turning now to FIGS. 3 to 6 and 12, the heat exchanger assembly 100 will be described in more detail. The heat exchanger assembly 100 has a front portion 102, a rear portion 104 and a middle portion 106 between the front and rear portions 102, 104. As can be seen, the front portion 102 is curved down from the middle portion 106 such that the front portion 102 extends below the middle portion 106. As best seen in FIG. 12, the heat exchanger assembly 100 is made of two main parts: a top part 108 and a bottom part 110.

Figure 4:
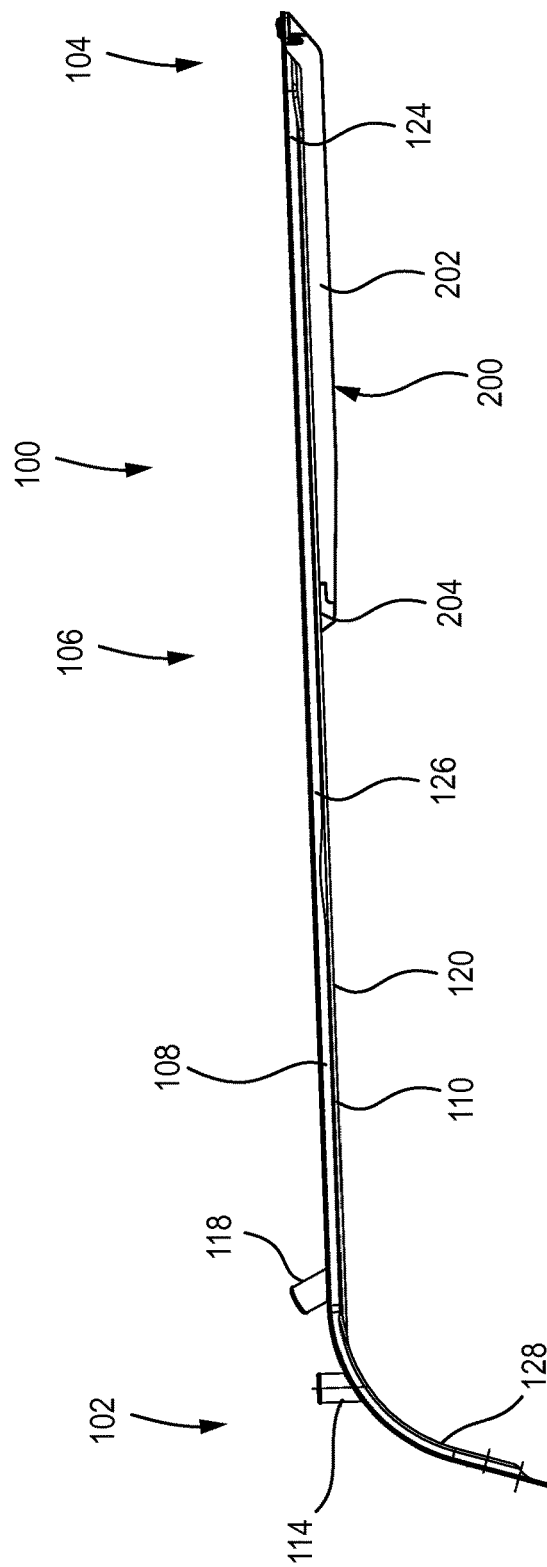
FIG. 4 is a left side elevation view of a heat exchanger assembly forming part of a tunnel of the frame of FIG. 2 with a tunnel guard connected to a bottom of the heat exchanger assembly.
Figure 5:
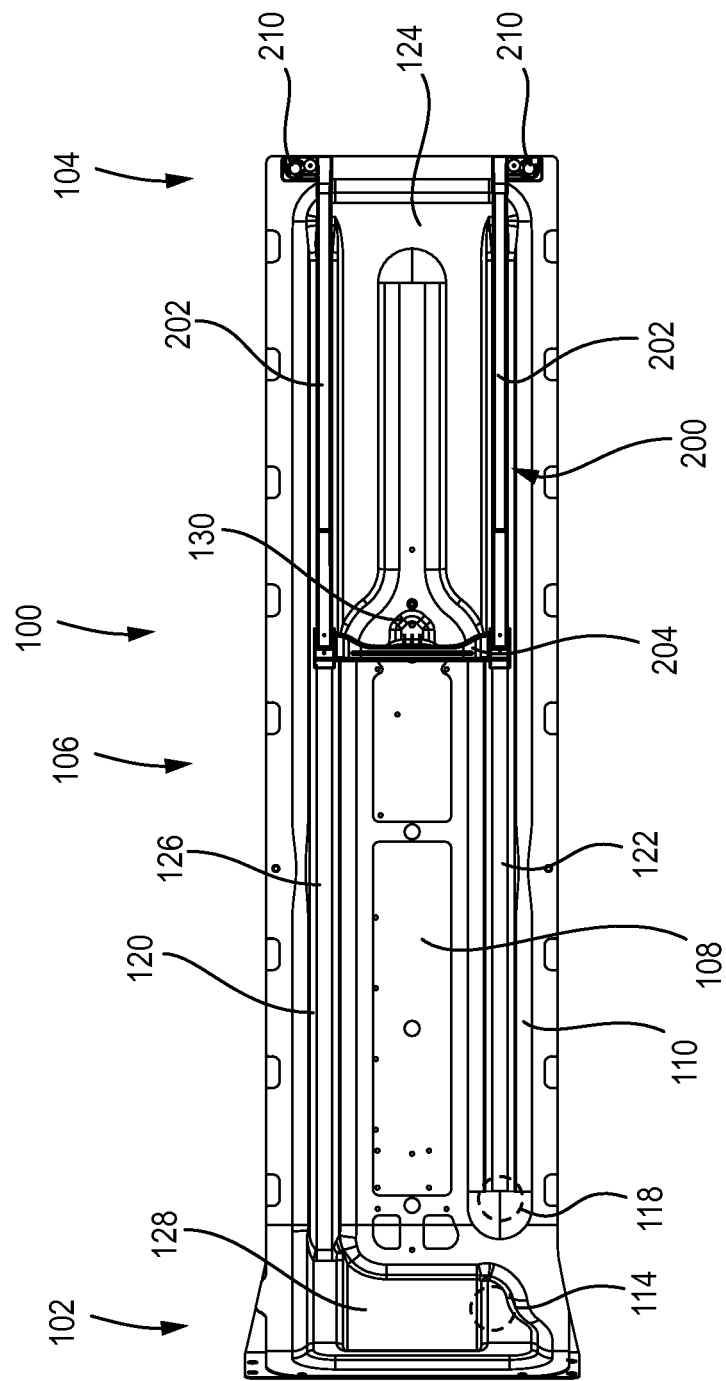
FIG. 5 is a bottom plan view of the heat exchanger assembly and tunnel guard of FIG. 4.
Figure 6:
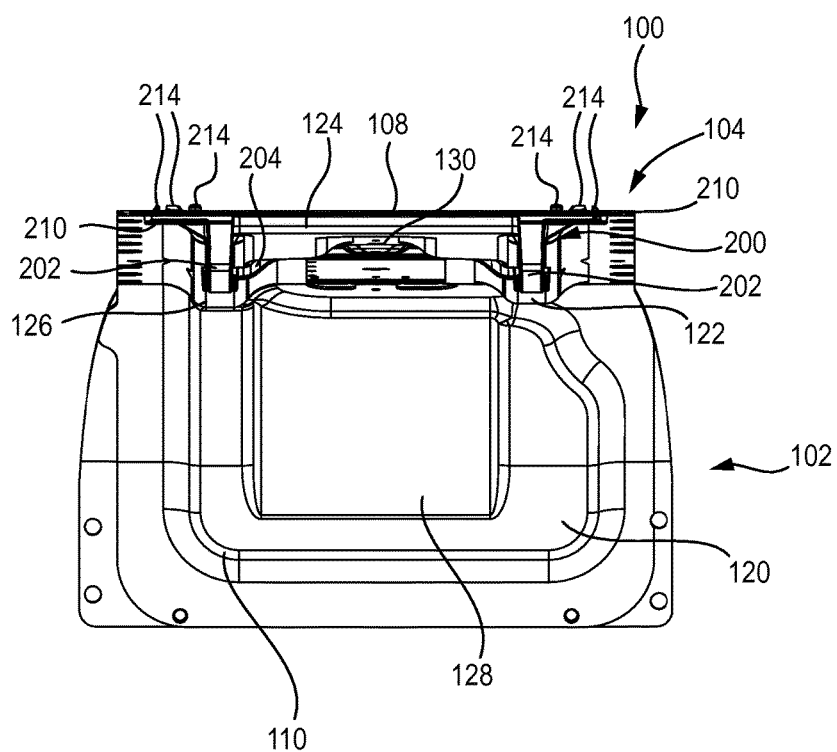
FIG. 6 is a rear elevation view of the heat exchanger assembly and tunnel guard of FIG. 4.

As can be seen in FIGS. 4 to 6, the top part 108 is made of a piece of sheet metal that is curved down at its front. The front portion of the top part 108 is flat, and then curves to the middle portion of the top part 108. The middle and rear portion of the top part 108 are flat. A plurality of apertures is formed in the top part 108 to permit the attachments of various components of the snowmobile 10 to the heat exchanger assembly 100 such as the fuel tank 28. An aperture is formed in the curved portion of the top part 108 to receive an outlet pipe 114 providing an outlet to a passage 116 of the heat exchanger assembly 100. Another aperture is formed in the middle portion of the top part 108 rearward of the outlet 114 to receive an inlet pipe 118 providing an inlet of the passage 116 of the heat exchanger assembly 100. It is contemplated that the outlet pipe 114 could be disposed rearward of the inlet pipe 118 or that they could be at a same distance from the front of the top part 108. Although shown on the right side near a front of the top part 108, it is contemplated that the outlet pipe 114 and inlet pipe 118 could be anywhere on the top part 108 as long as the geometry of the passage 116 discussed below is modified accordingly.

The bottom part 110 is made of a piece of sheet metal that is curved down at its front such that its curvature matches the curvature of the top part 108. Once curved, the bottom part 110 is stamped to form a recess 120. The border of the bottom part 110 disposed around the recess 120 is welded or otherwise joined to the top part 108 to form the heat exchanger assembly 100

By joining the top part 108 to the bottom part 110, the passage 116 is formed between the recess 120 and the top part 108. The recess 120 defines the shape of the passage. This passage permits the flow of engine coolant through the heat exchanger assembly 100. Although in the present implementation the heat exchanger 100 is used to cool engine coolant, it is contemplated that it could be used to cool other motor fluids such as, for example, oil used to lubricate the engine 26 or air to be supplied to the engine 26.

During operation of the engine 26, the hot engine coolant flows from the engine 26 through a pipe (not shown) connected to the inlet pipe 118, then through the inlet pipe 118 and into the passage 116 formed between the top and bottom parts 108, 110.

As can be seen in FIG. 5, the inlet pipe 118 (shown in dotted lines) opens over a front of a narrow portion 122 of the passage 116. From the inlet pipe 118, the coolant flows rearward into the narrow and long portion 122 of the passage 116 defined by a narrow part of the recess 120 and extending along the middle portion 106 on a right side thereof. From the portion 122 of the passage 116, the coolant flows rearward and laterally into a portion 124 of the passage 116 defined by a wider part of the recess 120 along the rear portion 104 of the heat exchanger assembly 100. From the portion 124 of the passage 116, the coolant flows forward into a narrow and long portion 126 of the passage 116 defined by a narrow part of the recess 120 and extending along the middle portion 106 on a left side thereof. From the portion 126, the coolant flows forwardly and then laterally into a portion 128 of the passage 116 defined by a wide part of the recess 120 along the front portion 102 of the heat exchanger assembly 100. As can be seen, the portion 128 of the passage 116 is curved to follow a curvature of the top part 108. From the portion 128 of the passage 116, the coolant flows out of the passage 116 via the outlet pipe 114. The outlet pipe 114 is connected to a pipe (not shown) connected between the outlet pipe 114 and the engine 26. From the outlet pipe 114, the now cooled coolant is returned to the engine 26 via this pipe. The above is only one possible implementation of a heat exchanger assembly and alternative implementations of the heat exchanger assembly 100 are contemplated.

As best seen in FIG. 12, the bottom part 110 of the heat exchanger assembly 100 is bent down at a position laterally between the portions 122, 126 of the passage 116 and forward of the portion 124 of the passage 116 to form a lip 130. As a result, a groove 2 is formed between the lip 130 and the top part 108 of the heat exchanger assembly 100. The groove 132 is laterally centered in the heat exchanger assembly 100 and opens toward a front of the snowmobile 10. As will be described below, the groove 132 is used to connect a tunnel guard 200 to the bottom of the tunnel 18. Two apertures 134 and two aperture 136 are defined through the top and bottom parts 108, 110 of the heat exchanger assembly 100 rearward of the portion 124 of the passage 116. The apertures 134, 136 are also used to connect the tunnel guard 200 to the bottom of the tunnel 18.

Turning now to FIGS. 7 to 11 the tunnel guard 200 will be described. The tunnel guard 200 has left and right arms 202 and a cross-member 204. The front end portions of the arms 202 are fastened to the lateral end portions of the cross-member 202, as will be described in more detail below. In the implementation illustrated, the arms 202 are parallel to each other and are perpendicular to the cross-member 204. It is contemplated that the arms 202 could be angled relative to each other and/or not perpendicular to each other.

Figure 7:
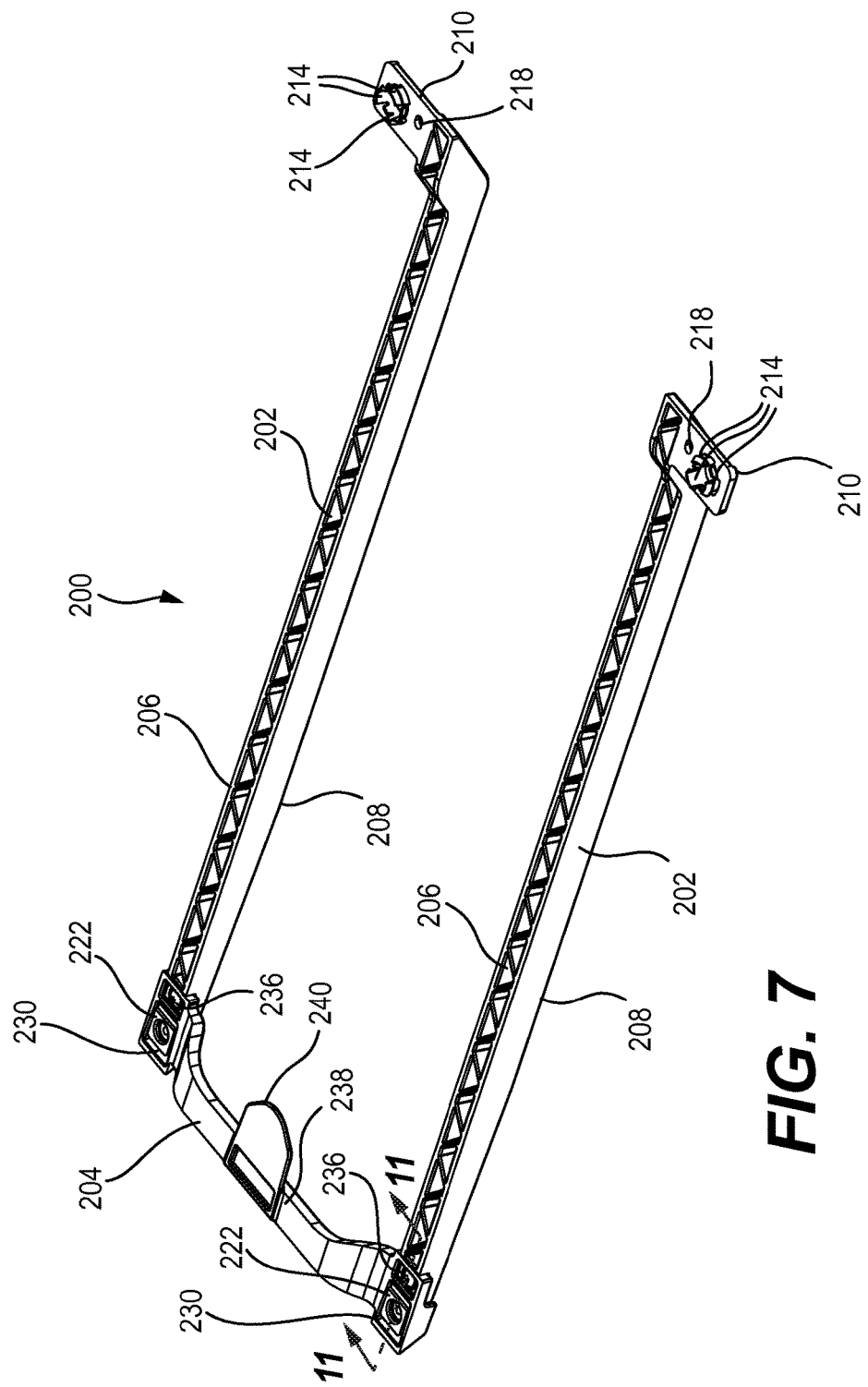
FIG. 7 is a top perspective view taken from a rear, left side of the tunnel guard of FIG. 4.

The arms 202 and the cross-member 204 are made of plastic. As can be seen in FIG. 7, the arms 202 have a trussed structure in order to reduce their weight while maintaining their rigidity. It is contemplated that the arms 202 and the cross-member 204 could be made of a different material and/or could have a structure that differs from the one illustrated herein. For example, it is contemplated that the arms 202 could be hollow metal or plastic tubes.

The left arm 202 will now be described. As the right arm 202 is a mirror image of the left arm 202, it will not be described in detail herein. Elements of the right arm 202 corresponding to those of the left arm 202 have been labeled with the same reference numerals.

Figure 8:
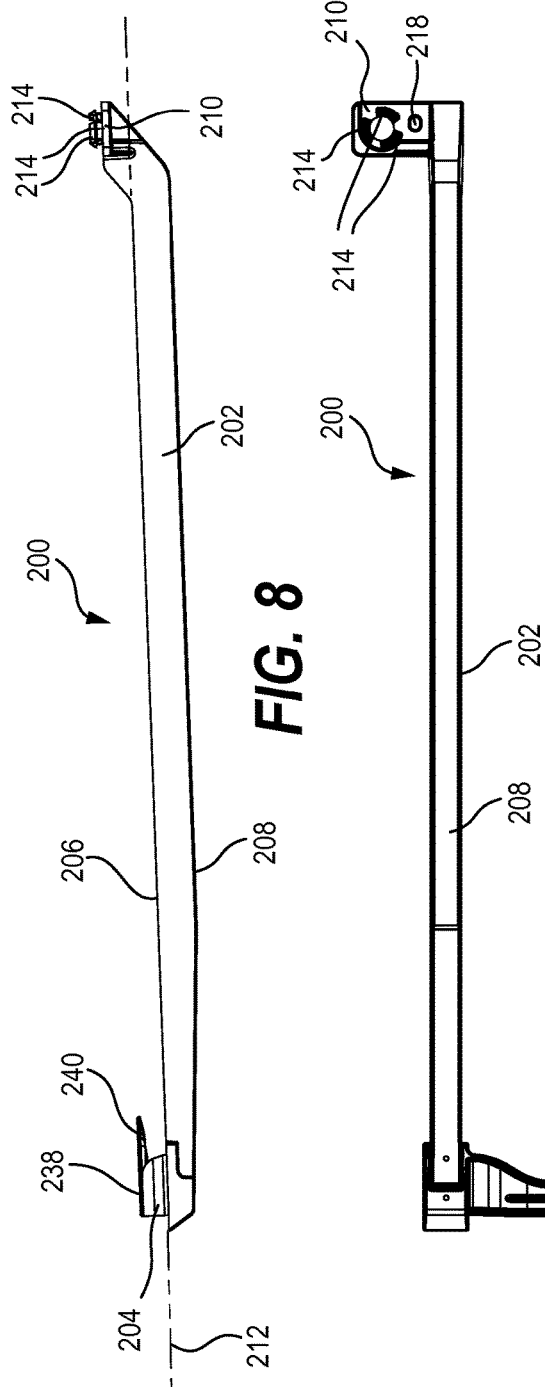
FIG. 8 is a left side elevation view of the tunnel guard of FIG. 7.
Figure 9:
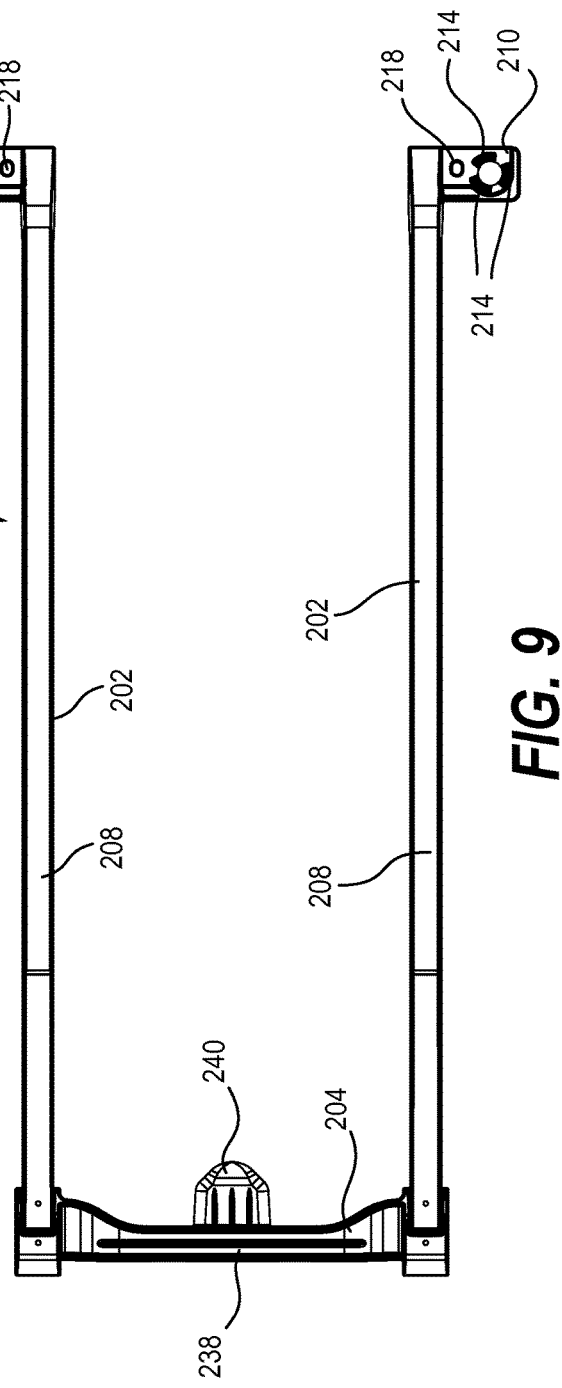
FIG. 9 is a top plan view of the tunnel guard of FIG. 7.
Figure 10:
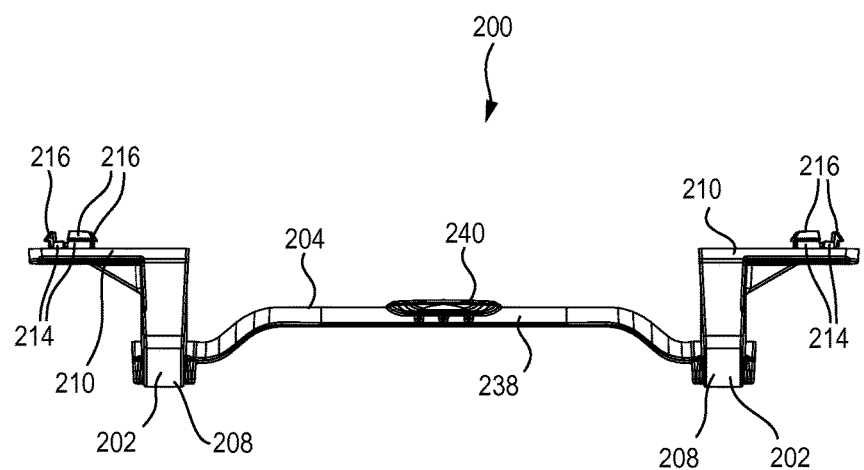
FIG. 10 is a rear elevation view of the tunnel guard of FIG. 7.

As can be seen in FIG. 9, the left arm 202 is straight except at its rear portion. As can be seen in FIG. 8, the top surface 206 of the left arm 202 is flat except at the rear portion of the arm 202 where it extends upward and rearward. It is contemplated that the top surface 206 could not be flat. For example, should the surface to be abutted on the tunnel 18 by the top surface 206 of the arm 202 be curved, the top surface 206 would have a corresponding curvature. It is contemplated that the top surface 206 could not be complementary to the surface under which the arm 202 is to be disposed on the tunnel 18. As can be seen in FIG. 8, the lower surface 208 of the arm 202 is generally straight except that it extends upward and forward at the front of the arm 202 and upward and rearward at the rear of the arm 202. It is contemplated that the bottom surface 208 could have another shape.

The rear end portion of the left arm 202 defines a tab 210 that extends toward the left. As best seen in FIG. 8, the tab 210 is spaced vertically above a plane 212. The plane 212 is a plane containing the top surfaces 206 of the front portions of both arms 202.

The tab 210 has three resilient tabs 214 extending upwardly therefrom and arranged in a circle. Each resilient tab 214 has an outwardly extending detent 216 formed near an upper end thereof (see FIG. 10). The tabs 214 and detents 216 form part of a connection element used to connect the rear portion of the arm 202 to the tunnel 18. A diameter of a circle defined by the outwardmost edges of the detents 216 is slightly larger that a diameter of the aperture 134 in the tunnel.

To connect the rear portion of the arm 202 to the tunnel, the tabs 214 are inserted into the corresponding aperture 134. As they are being inserted through a bottom of the aperture 134, the tabs 214 flex due to the shape of the detent. Once the detents 216 are located above the top part 108 of the heat exchanger assembly 100, the tabs 214 snap back to their original positions and the detents 216 prevent the tabs 214 from being pulled out of the aperture 134. As a result, the rear portion of the arm 202 is connected to the heat exchanger assembly 100 and therefore to the tunnel 18.

Figure 13:
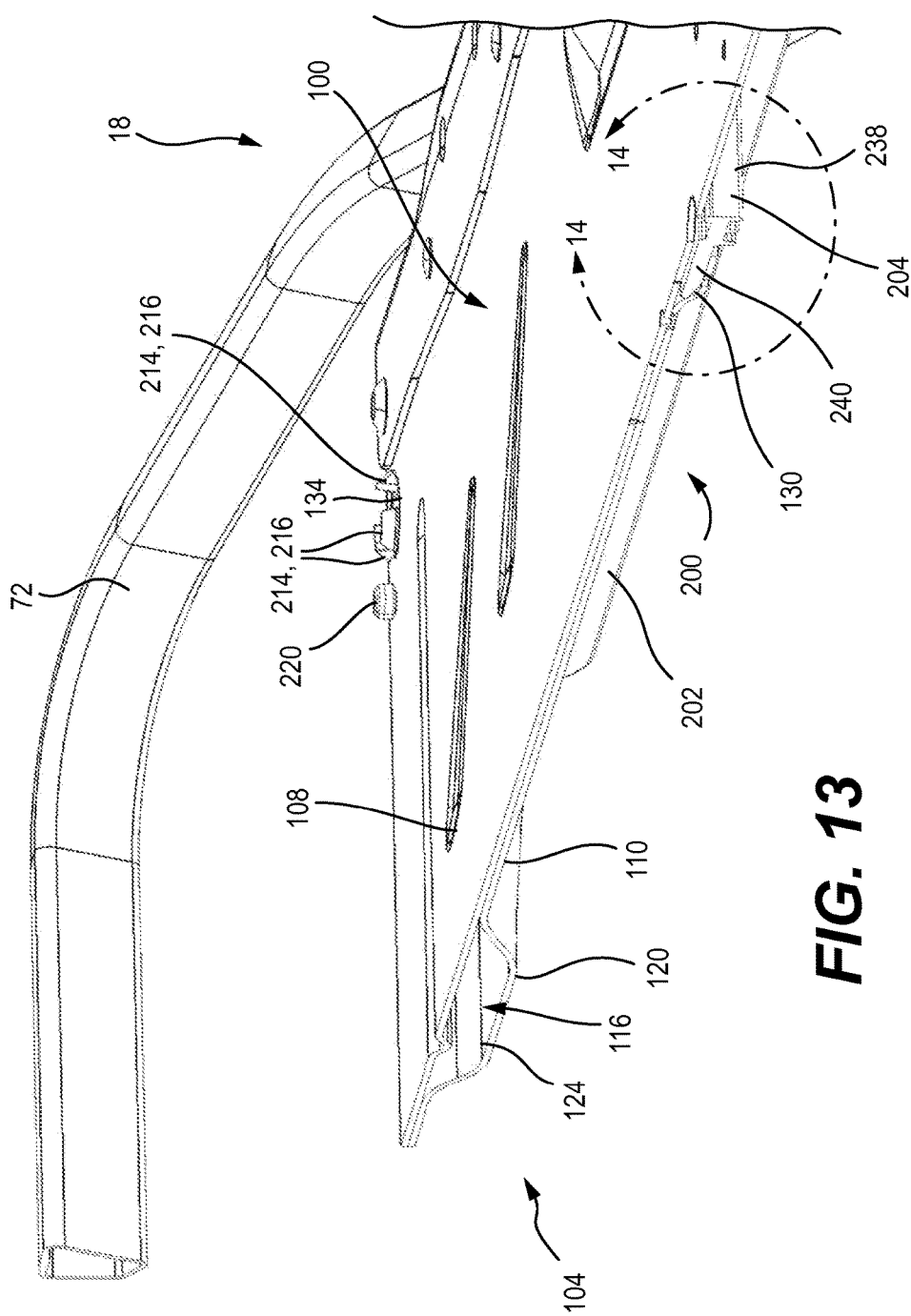
FIG. 13 is a perspective view taken from a front, right side of the cross-sectional view of the tunnel taken through line 12-12 of FIG. 3 with the tunnel guard connected to the tunnel.

The tab 210 also defines an aperture 218 to the right of the tabs 214. As can be seen in FIG. 13, a rivet 220 is inserted through the aperture 136 in the heat exchanger assembly 100 and the aperture 218 to further connect the rear portion of the arm 202 to the tunnel 18. It is contemplated that either the tabs 214 or the aperture 218 and rivet 220 could be omitted, in which case the corresponding aperture 134 or 136 could be omitted from the heat exchanger assembly. It is also contemplated that a type of connection element that differs from the ones described above could be used to connect the rear portion of the arm 202 to the tunnel 18.

Figure 11:
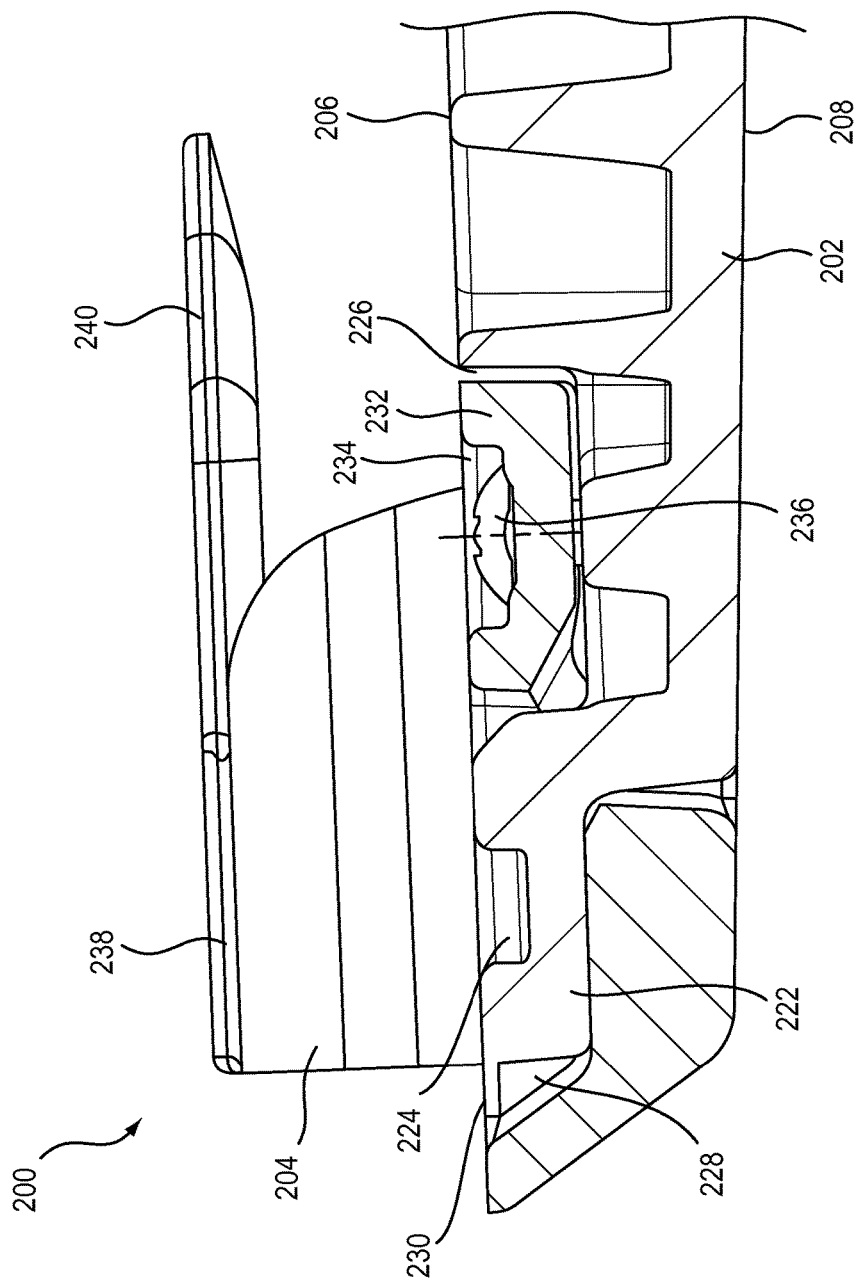
FIG. 11 is a cross-sectional view of the tunnel guard of FIG. 7 taken through line 11-11 of FIG. 7.

As mentioned above, the front end portion of the left arm 202 is connected to the left end of the cross-member 204. As best seen in FIG. 11, the front end of the left arm 202 has an inverted L-shaped portion 222. A bore 224 is formed in the top of the portion 222. A recess 226 is formed rearward of the inverted L-shaped portion 222 in the top of the arm 202. The left end of the cross-member 204 defines an inverted L-shaped passage 228 that forms an aperture 230 in the top of the left end of the cross-member 204. The portion 232 of the left end of the cross-member 204 located rearward of the aperture 230 defines a recess 234 in a top thereof.

To connect the front portion of the left arm 202 to the cross-member 204, the inverted L-shaped portion 222 is inserted in the passage 228 from under the left end of the cross-member 204. The rear end portion of the left arm 202 is then pivoted upwardly such that the inverted L-shaped portion 222 of the arm 202 is disposed in the inverted L-shaped passage 228 and the portion 232 of the cross-member 204 is received in the recess 226 of the arm 202 as shown in FIG. 11. A fastener 236 is fastened through the portion 232 of the cross-member 204 and the portion of the arm 202 disposed below the portion 232 of the cross-member 204. As can be seen, once fastened, the head of the fastener 236 is located in the recess 234 and is disposed below the top surface of the left end of the cross-member 204. By inserting the fastener 236 as indicate above, the head of the fastener 236 is held captive between the portion 232 of the cross-member 204 and the bottom of the tunnel 18 when the tunnel guard 200 is connected to the tunnel 18. It is contemplated that a fastener could be fastened into the inverted L-shaped portion 222 and the portion of the left end of the cross-member 204 such that the head of the fastener is completely received in the bore 224. This fastener could be provided in addition to or instead of the fastener 236.

As can be seen, once the arm 202 is fastened to the left end of the cross-member 204, the top surfaces of the left end of the cross-member 204 and of the front end portion of the left arm 202 are generally flush with each other. Similarly, the bottom surfaces of the left end of the cross-member 204 and of the front end portion of the left arm 202 are generally flush with each other. It is contemplated that these surfaces could not be flush.

It is contemplated that the arms 202 could be connected to the cross-member 204 by other means. For example, the arms 202 and the cross-member 204 could be integrally formed. However, by using non-permanent fastener such as the fastener 236 described above, the arms 202 can easily be replaced should they become damaged by the drive track 30. It is also contemplated that the cross-member 204 could be connected to the arms 202 rearward of the front end portions of the arms 202. It is also contemplated that the arms 202 could be longer or shorter than illustrated in the figures.

Figure 14:
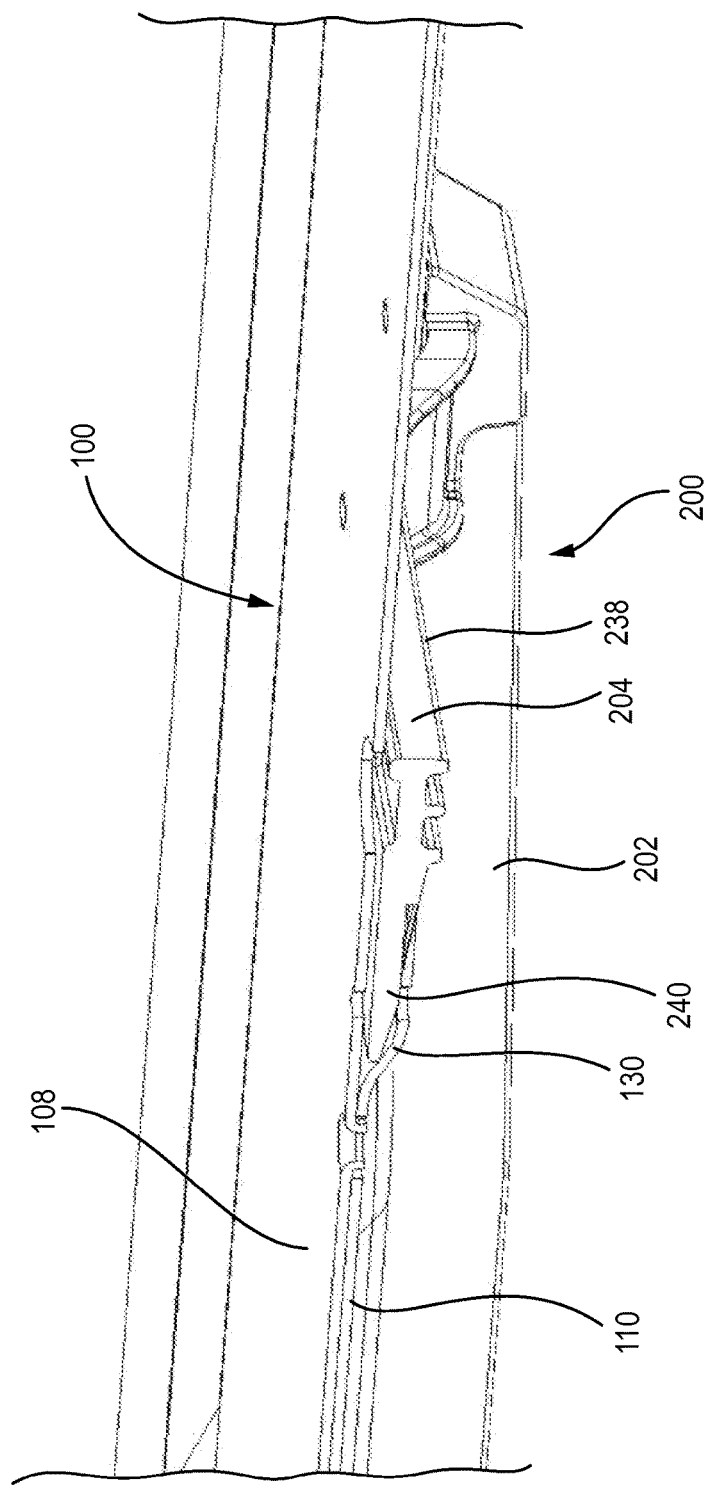
FIG. 14 is a close-up of portion 14-14 of FIG. taken from a different perspective.

As can be seen in FIG. 8, the laterally central portion 238 of the cross-member 204 is spaced vertically above the portion of the bottom surface 208 of the arms 202 that is longitudinally aligned with the cross-member 204. In the present implementation, the laterally central portion 238 of the cross-member 204 is spaced vertically above the plane 212. It is contemplated that the laterally central portion 238 of the cross-member 204 could be lower than illustrated as long as it is sufficiently vertically spaced above the bottom surface 208 of the arms 202 so as not to interfere with the studs 82, 83 as will be described below. A tongue 240 extends rearward from the central portion 238 of the cross-member 204 and forms a connection element of the cross-member 204. As can be seen in FIG. 9, the tongue 240 is laterally centered on the cross-member 204. As such, the tongue 240 is disposed laterally between the arms 202. The tongue 240 is shaped so as to be received in the groove 132 as shown in FIGS. 13 and 14. By inserting tongue 240 in the groove 132, the front of the tunnel guard 200 is connected to the bottom of the tunnel 18. The tongue 240 is shaped such that when the tongue 240 is in the groove 132 when the tunnel guard 200 is connected to the tunnel 18, the tongue 240 is slightly flexed to apply a force on the lip 130 that biases the tunnel guard 200 against the bottom of the tunnel 18. It is contemplated that other types of connection elements could be used to connect the front of the tunnel guard 200 to the tunnel 18.

In order to connect the tunnel guard 200 to the bottom of the tunnel 18, the tunnel guard 200 is inserted from behind the snowmobile 10 into the tunnel 18 between the top of the drive track 30 and the bottom of the heat exchanger 100. The tunnel guard 200 is moved forward until the tongue 240 is located forward of the lip 130 formed by the bottom part 110 of the heat exchanger assembly 100. The tunnel guard 200 is then moved rearward to insert the tongue 240 into the groove 132. The arms 214 located on the tab 210 at the rear of the arms 202 are then snapped into their corresponding apertures 134 in the heat exchanger assembly 100. Finally, the rivets 220 are inserted into the aperture 136 and 218 to fasten the heat exchanger assembly 100 to the tabs 210 of the arms 202. As would be appreciated, if the rear portions of the arms 202 were to be connected to the tunnel 18 prior to inserting the tongue 240 into the groove 132, it would not be possible to insert the tongue 240 into the groove 132.

As would be appreciated, the tunnel guard 200 is connected to the bottom of the tunnel 18 without requiring any apertures to be formed in a portion of the heat exchanger assembly 100 that could cause a leak in the passage 116 for the motor fluid. The top surfaces of the tunnel guard 200 generally conform to the bottom surfaces of the heat exchanger assembly 100. As best seen in FIG. 5, when the tunnel guard 200 is connected to the tunnel 18, the right arm 202 extends along a rear part of the portion 126 of the passage 116 of the heat exchanger 100 and the left arm 202 extends along a rear part of the portion 122 of the passage 116 of the heat exchanger 100.

As can be seen in FIG. 15, the arms 202 of the tunnel guard 200 are disposed vertically between some of the rows of external lugs 78 and the bottom of the tunnel 18. Therefore, during operation of the snowmobile 10, should the drive track 30 move toward the bottom of the tunnel 18, the external lugs 78 come into contact with the arms 202 before they, or the studs 82, 83, can come in contact with the bottom of the tunnel 18. The arms 202 are sufficiently thick that, even though the studs 82 are taller than the external lugs 78 and the studs 83 protrude from the ends of the external lugs 78, when the external lugs 78 contact the arm 202 the studs 82, 83 are still spaced from the bottom of the tunnel 18. Also, as the central portion 238 of the cross-member 204 is vertically spaced from the bottom surface 208 of the arms 202, the studs 82, 83 will not contact the cross-member 204 as the track 30 turns during operation of the snowmobile 10.

It is contemplated that in an alternative implementation, the tunnel 18 could have the tongue 240 and that the groove 132 could be defined in the cross-member 204, with the tongue 140 extending forwardly and the groove 132 opening toward the rear of the snowmobile 10.

Turning now to FIGS. 16 to 19, a tunnel guard 300 and a heat exchanger 400, which are alternative implementations of the tunnel guard 200 and the heat exchanger 100 described above, will be described. For simplicity, components and features of the tunnel guard 300 and of the heat exchanger 400 that are similar to those described above with respect to the tunnel guard 200 and the heat exchanger 100 have been labeled with the same reference numerals and will not be described again below.

The tunnel guard 300 is configured to be connected to the bottom of the heat exchanger 400. In the present implementation, the heat exchanger 400 is identical to the heat exchange 100 except that the heat exchanger 400 does not have the lip 130, and therefore it also does not define the groove 132. As such, the heat exchanger 400 can be used in the tunnel 18 described above. It is contemplated that the heat exchanger 400 could have other differences with the heat exchanger 100. Instead of the lip 130, the heat exchanger 400 has an aperture 402 defined therethrough. The aperture 402 is disposed laterally between the portions 122 and 126 of the passage 116 and forward of the portion 124 of the passage 116.

In the present implementation, the tunnel guard 300 is identical to the tunnel guard 200 except that an aperture 302 is defined through the tongue 240. It is contemplated that the tunnel guards 100 and 300 could have other differences. It is contemplated that the tongue 240 could be omitted and that the aperture 302 could be defined through the portion 238 of the cross-member. It is also contemplated that there could be more than one aperture 302 and one aperture 402.

Figure 18:
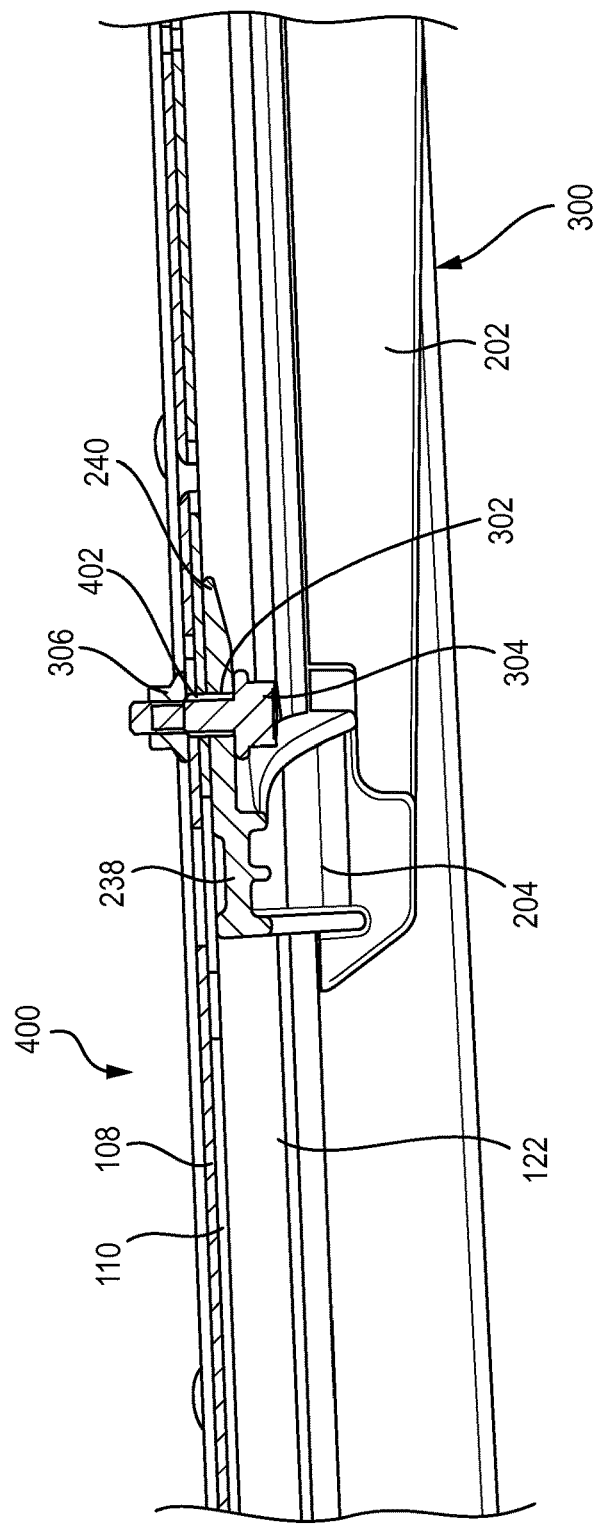
FIG. 18 is a cross-sectional view of the heat exchange assembly and tunnel guard of FIG. 17 taken through line 18-18 of FIG. 17.

To connect the tunnel guard 300 to the bottom of the heat exchanger 400, and therefore to its corresponding tunnel 18, the apertures 302 and 402 are aligned with each other. As seen in FIG. 18, a bolt 304 is inserted through the apertures 302, 402 and a nut 306 is fastened on the end of the bolt 304, thereby fastening the cross-member 204 to the bottom of the heat exchanger 400. The rear end portions of the arms 202 of the tunnel guard 300 are connected to the rear of the heat exchanger 400 in the same manner as the rear end portions of the arms 202 of the tunnel guard 200 are connected to the rear of the heat exchanger 100 in the implementations described above.

Figure 19:
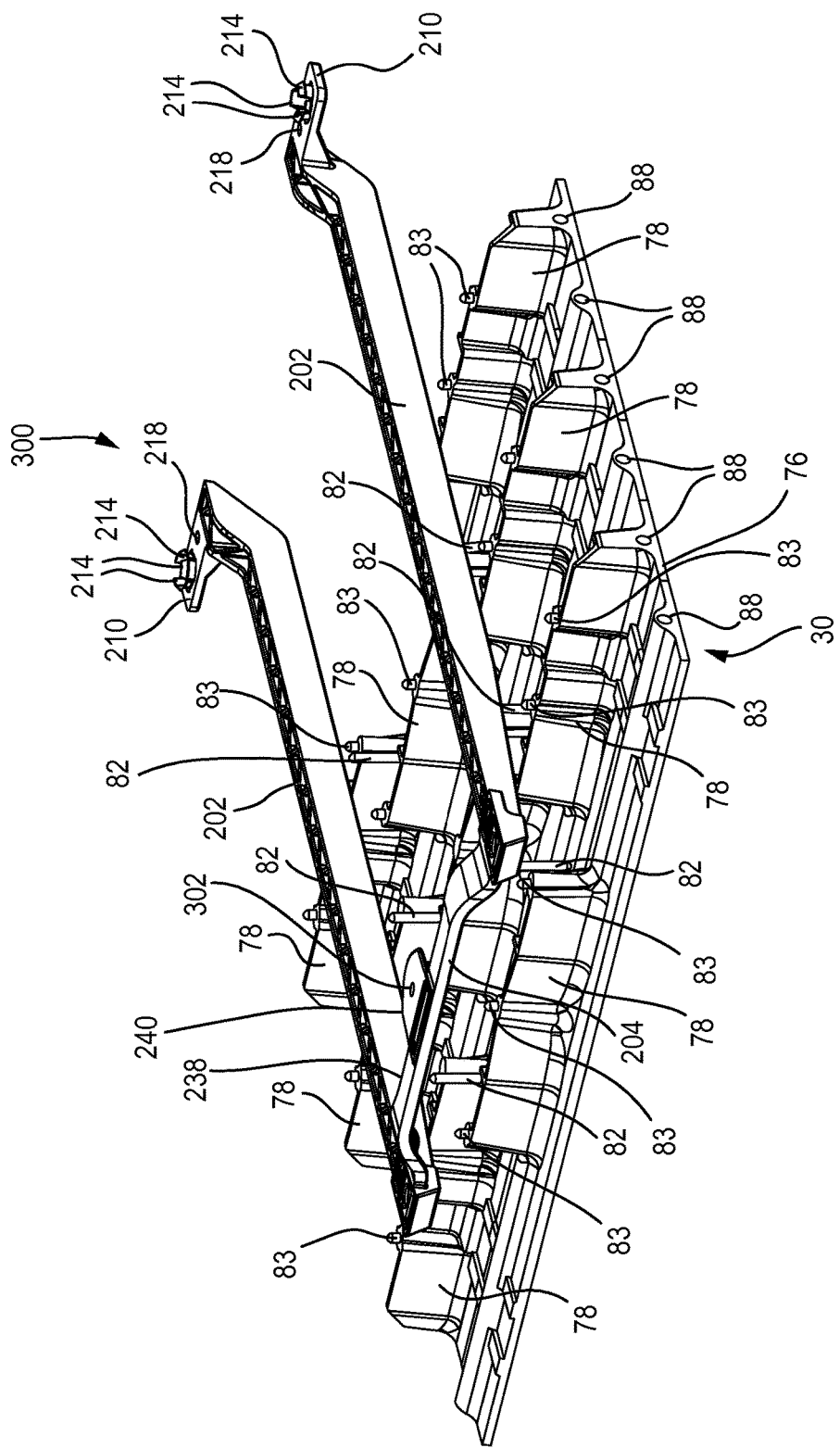
FIG. 19 is a top perspective view taken from a front, left side of the tunnel guard of FIG. 16 with a portion of a drive track of the snowmobile of FIG. 1.
Figure 20:
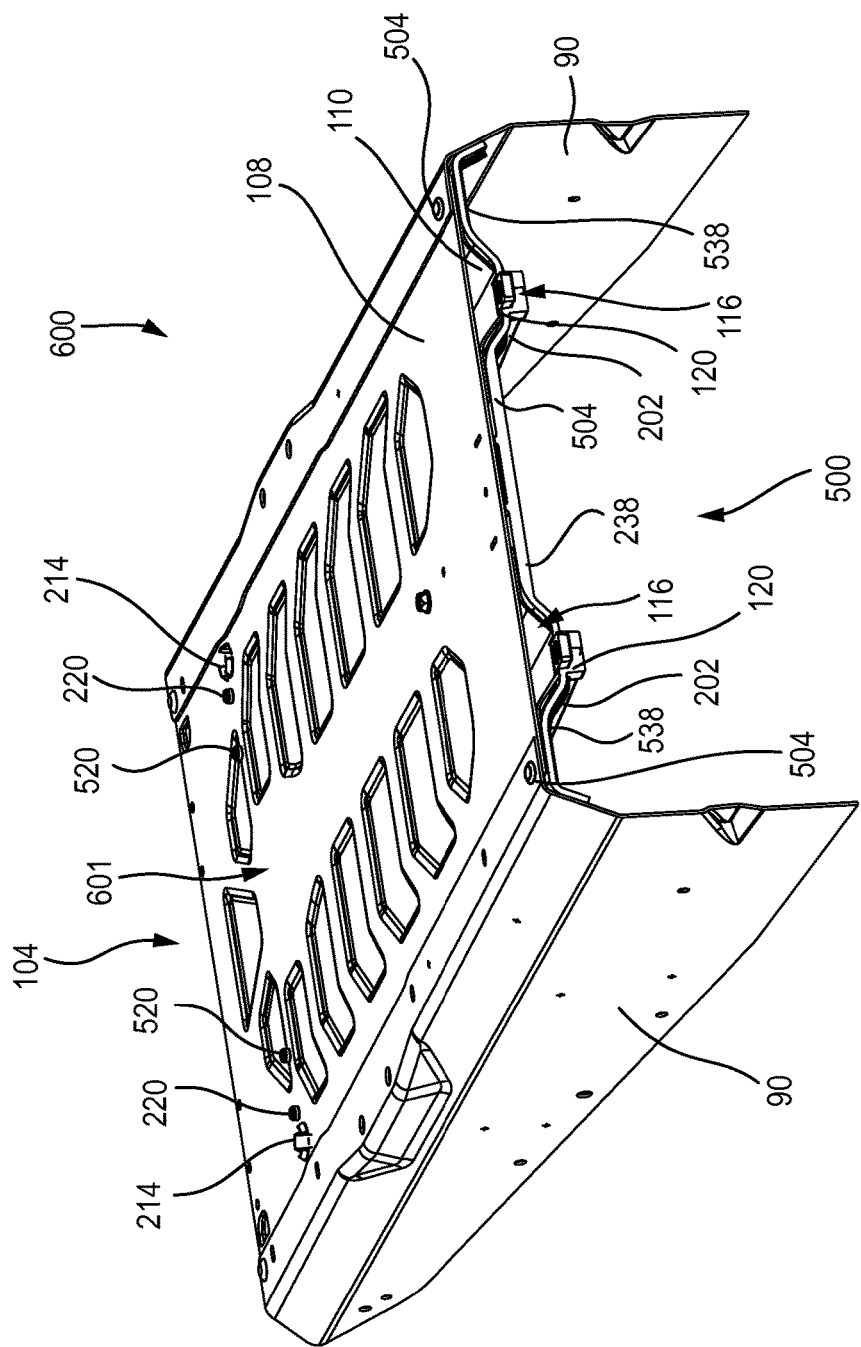
FIG. 20 is perspective view taken from a front, right side of a cross-section of alternative implementations of a tunnel and a tunnel guard of the snowmobile of FIG. 1, with the cross-section being taken laterally through a cross-member of the tunnel guard.
Figure 21:
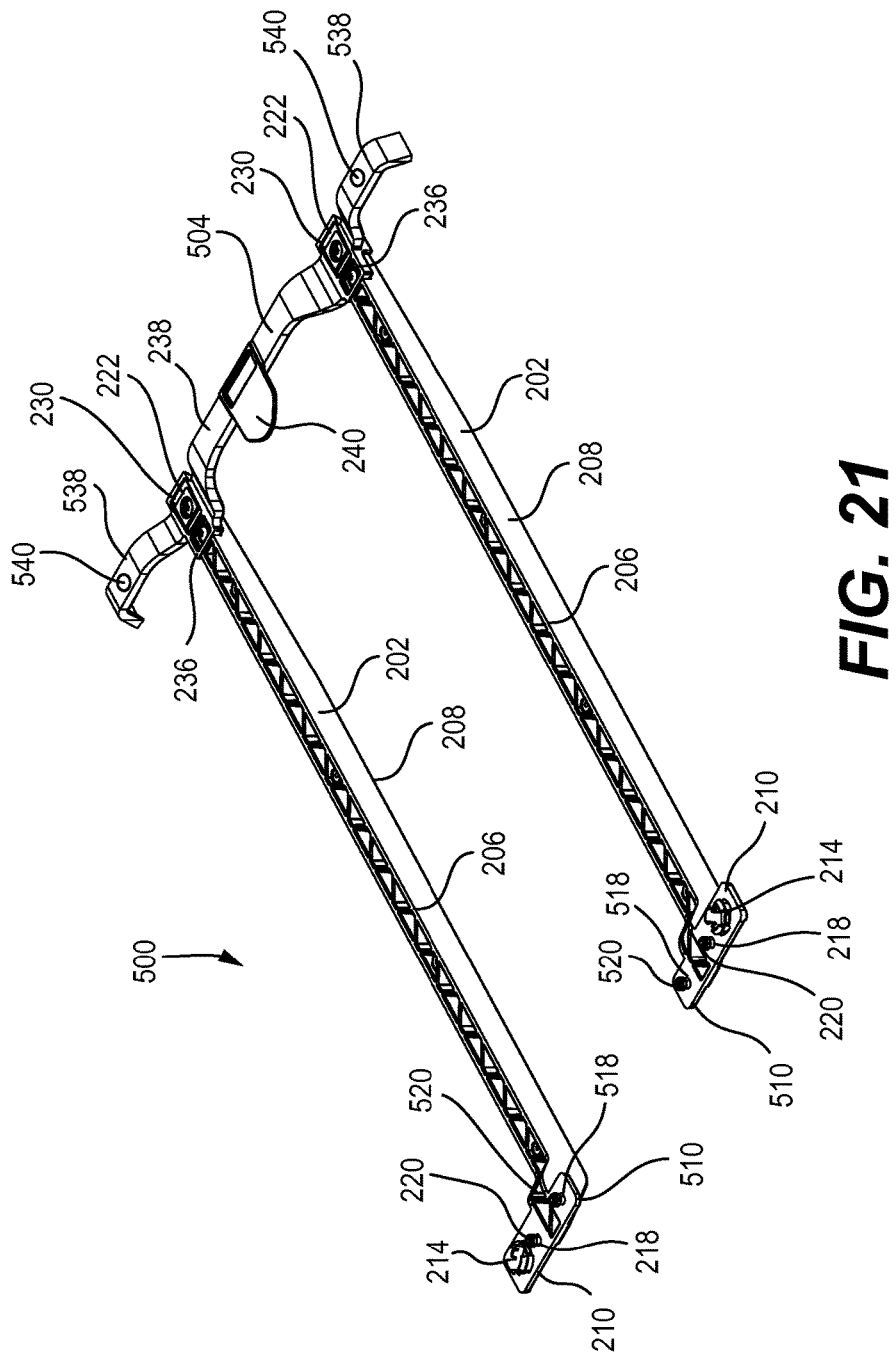
FIG. 21 is a perspective view taken from a rear, right side of the tunnel guard of FIG. 20.
Figure 22:
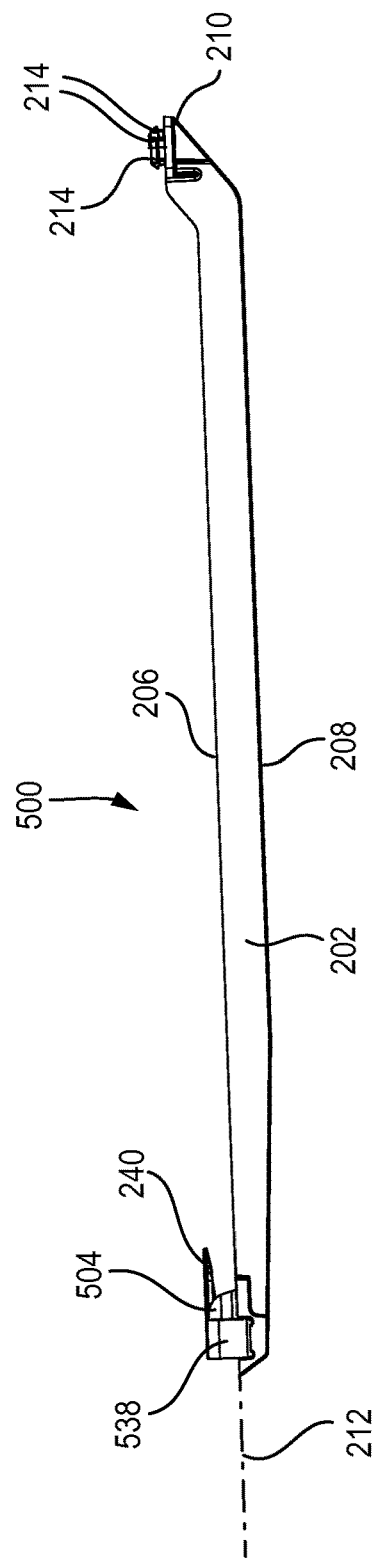
FIG. 22 is a left side elevation view of the tunnel guard of FIG. 20.
Figure 23:
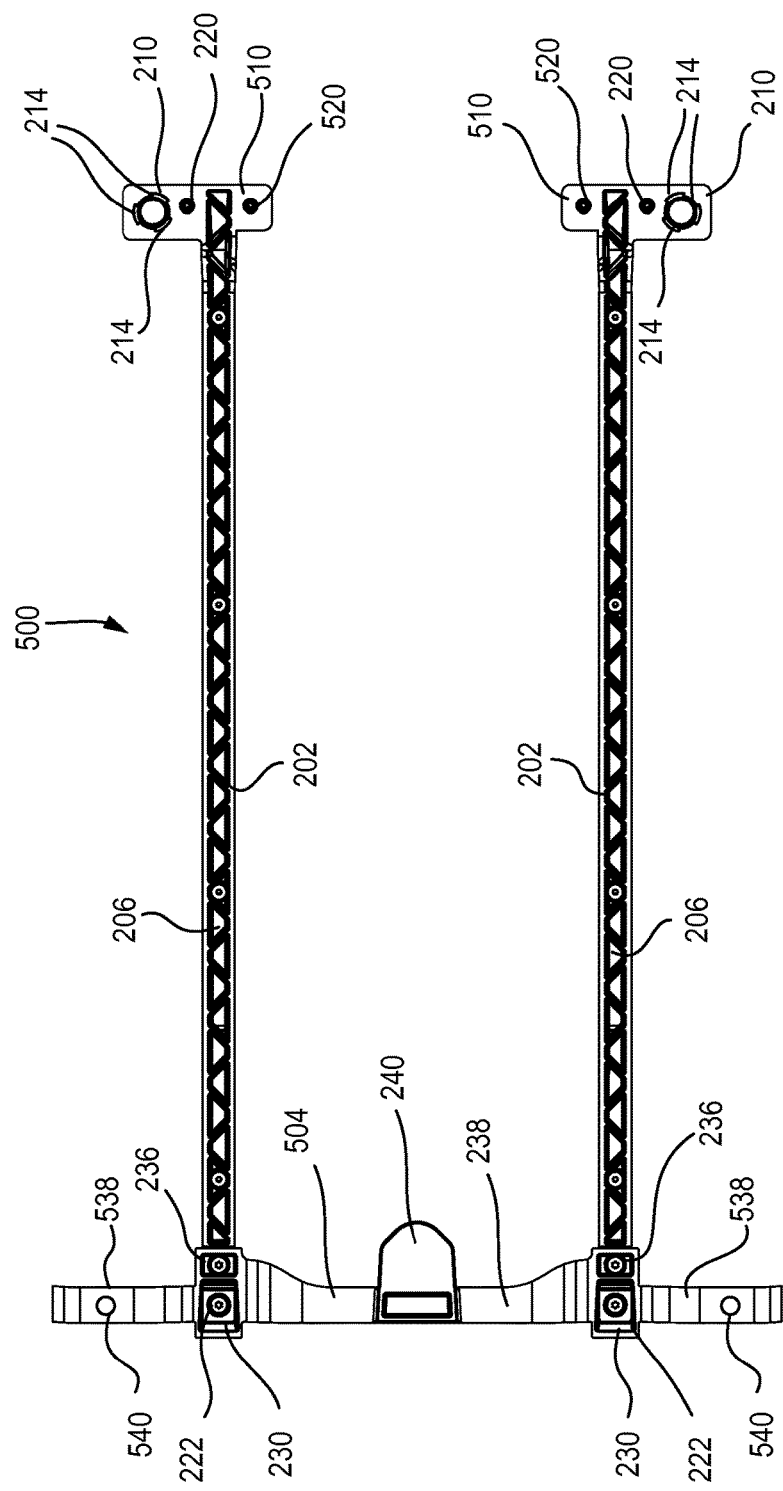
FIG. 23 is top plan view of the tunnel guard of FIG. 20.
Figure 24:
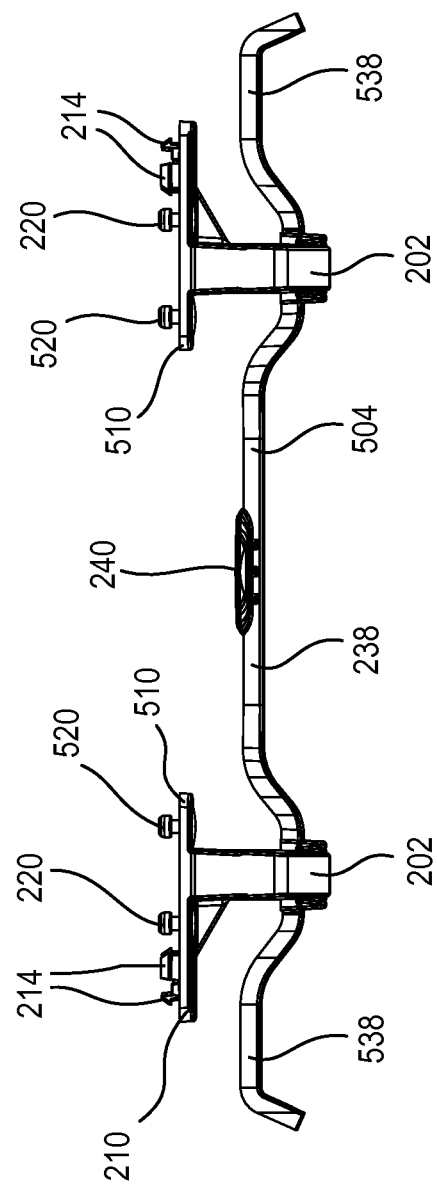
FIG. 24 is a rear elevation view of the tunnel guard of FIG. 20.
Figure 25:
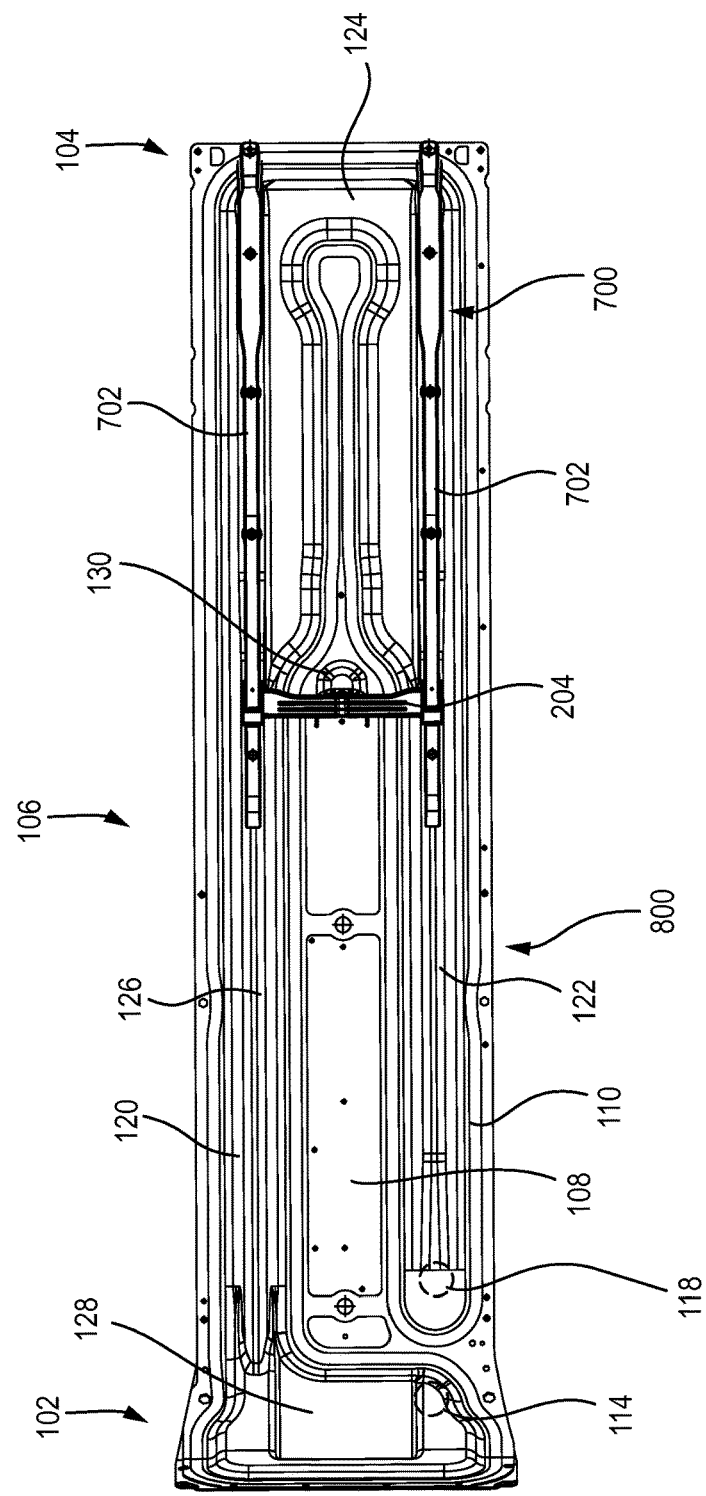
FIG. 25 is a bottom perspective view taken from a rear, left side of an alternative implementation of the heat exchanger assembly of FIG. 4 with an alternative implementation of a tunnel guard connected to a bottom of the heat exchanger assembly.
Figure 26:
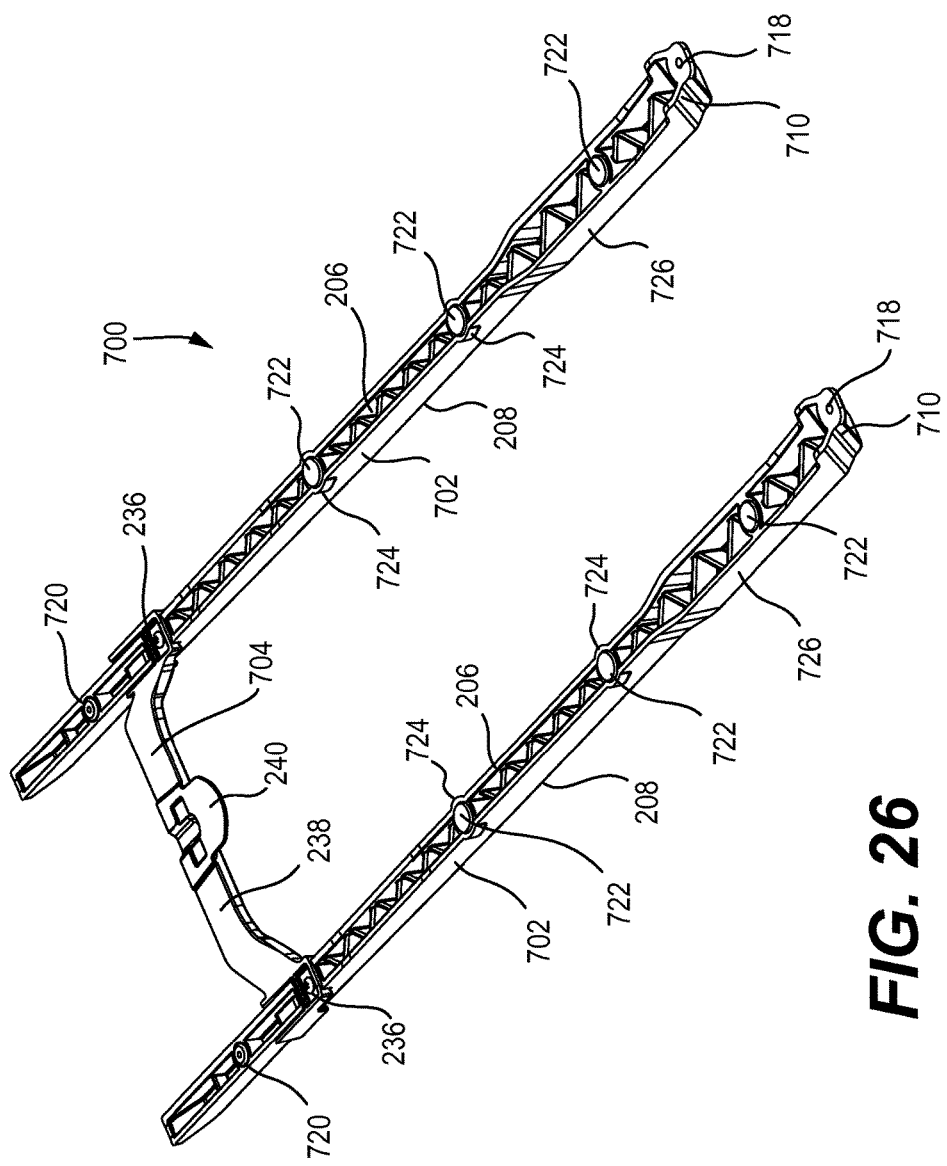
FIG. 26 is a perspective view taken from a rear, left side of the tunnel guard of FIG. 25.

As would be understood from FIG. 19, during operation of the snowmobile 10, should the drive track 30 move toward the bottom of the tunnel 18, the external lugs 78 come into contact with the arms 202 before they, or the studs 82, 83, can come in contact with the bottom of the tunnel 18. The arms 202 are sufficiently thick that, even though the studs 82 are taller than the external lugs 78 and the studs 83 protrude from the ends of the external lugs 78, when the external lugs 78 contact the arm 202 the studs 82, 83 are still spaced from the bottom of the tunnel 18. Also, as the central portion 238 of the cross-member 204 is vertically spaced from the bottom surface 208 of the arms 202, the studs 82, 83 will not contact the cross-member 204 as the track 30 turns during operation of the snowmobile 10.

Turning now to FIGS. 20 to 24, a tunnel guard 500 and a tunnel 600 having a heat exchanger 601, which are alternative implementations of the tunnel guard 200 and the tunnel 18 having the heat exchanger 100 described above, will be described. For simplicity, components and features of the tunnel guard 500, the tunnel 600 and of the heat exchanger 601 that are similar to those described above with respect to the tunnel guard 200, the tunnel 18 and the heat exchanger 100 have been labeled with the same reference numerals and will not be described again below.

The tunnel guard 500 is configured to be connected to the bottom of the heat exchanger 601. In the present implementation, the tunnel 600 corresponds to the tunnel 18 except that it has the heat exchanger 601 instead of the heat exchanger 100. The heat exchanger 601 is similar to the heat exchange 100 except that the heat exchanger 601 has apertures (not shown) to receive rivets 504, 520 used to connect the tunnel guard 500 to the bottom of the heat exchanger 601. The side portions 90 of the tunnel 600 are also provided with apertures (not shown) to receive the rivets 504. It is contemplated that the heat exchanger 601 could have other differences with the heat exchanger 100.

In the present implementation, the tunnel guard 500 has a cross-member 504 instead of the cross-member 204 of the tunnel guard 200. The cross-member 504 is connected to the arms 202 in a manner similar to which the cross-member 204 is connected to the arms 202 in the tunnel guard 200. The cross-member 504 has a central portion 238 and a tongue 240. The cross-member 504 also has two side portions 538 that extend laterally outward of the arms 202. The side portions 538 are integrally formed with the central portion 238. It is contemplated that the side portions 538 could be connected to the arms 202 separately from the central portion 238. The side portions 538 of the cross-member 504 are spaced vertically above the portion of the bottom surface 208 of the arms 202 that is longitudinally aligned with the cross-member 504. In the present implementation, the side portions 538 of the cross-member 504 are spaced vertically above the plane 212. It is contemplated that the side portions 238 could be lower than illustrated as long as they are sufficiently vertically spaced above the bottom surface 208 of the arms 202 so as not to interfere with the studs 83 as will be described below. The side portions 538 define apertures 540 for receiving the rivets 504 used to connect the tunnel guard 500 to the bottom of the heat exchanger 601 as described below. It is contemplated that the apertures 540 could be defined closer to the ends of the side portions 538 so as to connect the tunnel guard to the side portions 90 of the tunnel 600.

The rear portions of the arms 202 have laterally outwardly extending tabs 210, with tabs 214 and apertures 218 as in the tunnel guard 200. The arms 202 also have laterally inwardly extending tabs 510 provided at the same level as the tabs 210. The tabs 510 each define an aperture 518. Rivets 520 are inserted through the apertures 518 and the corresponding apertures in the heat exchanger 601 to further connect the rear portions of the arms 202 to the tunnel 600. It is contemplated that the tabs 210 or the tabs 510 could be omitted, in which case the corresponding apertures could be omitted from the heat exchanger 601. It is also contemplated that a type of connection element that differs from the ones described above could be used to connect the rear portion of the arm 202 to the tunnel 600.

To connect the tunnel guard 500 to the bottom of the heat exchanger 601, and therefore to its corresponding tunnel 600, the tongue 240 is first inserted into the groove 132 and the tabs 214 are then inserted through their corresponding apertures in the heat exchanger 601 as with the connection of the tunnel guard 200 to the tunnel 18 described above. The rivets 220 are then inserted through the apertures 218 and the corresponding apertures in the heat exchanger 601. The rivets 520 are then inserted through the apertures 518 and the corresponding apertures in the heat exchanger 601. Finally, the rivets 504 are then inserted through the apertures 540 in the side portions 538 of the cross-member 504 and the corresponding apertures in the heat exchanger 601 and the side portions 90 of the tunnel 600. In an alternative implementation where the apertures 540 are closer to the ends of the side portions 538 of the cross-member 504, the rivets 504 are inserted through the apertures 540 and corresponding apertures in the side portions 90 of the tunnel 600, and not through the heat exchanger 601, in a manner similar to the one illustrated in the implementation of FIG. 30 described below. It is contemplated that the rivets 220, 504, 520 can be inserted in any order. It is contemplated that the tongue 240 could be omitted and that the cross-member 504 could be connected to the heat exchanger 601 using only the rivets 504 in the side portions 538.

During operation of the snowmobile 10, should the drive track 30 move toward the bottom of the tunnel 600, the external lugs 78 come into contact with the arms 202 before they, or the studs 82, 83, can come in contact with the bottom of the tunnel 600. The arms 202 are sufficiently thick that, even though the studs 82 are taller than the external lugs 78 and the studs 83 protrude from the ends of the external lugs 78, when the external lugs 78 contact the arm 202 the studs 82, 83 are still spaced from the bottom of the tunnel 600. As the central portion 238 of the cross-member 504 is vertically spaced from the bottom surface 208 of the arms 202, the studs 82, 83 will not contact the central portion 238 of the cross-member 504 as the track 30 turns during operation of the snowmobile 10. Also, as the side portions 538 of the cross-member 504 are vertically spaced from the bottom surface 208 of the arms 202, the studs 83 that are laterally outward of the arms 202 (see FIG. 15) will not contact the side portions 538 of the cross-member 504 as the track 30 turns during operation of the snowmobile 10.

Turning now to FIGS. 25 to 29, a tunnel guard 700 and a heat exchanger 800, which are alternative implementations of the tunnel guard 200 and the heat exchanger 100 described above, will be described. For simplicity, components and features of the tunnel guard 700 and of the heat exchanger 800 that are similar to those described above with respect to the tunnel guard 200 and the heat exchanger 100 have been labeled with the same reference numerals and will not be described again below.

The tunnel guard 700 is configured to be connected to the bottom of the heat exchanger 800. In the present implementation, the heat exchanger 800 corresponds to the heat exchanger 100 except that the portions 122, 124, 126, 128 of the passage 116 of the heat exchanger 800 are shaped differently than in the heat exchanger 100 and the heat exchanger 800 does not have the apertures 134, 136. The heat exchanger 800 is provided with two other apertures (not shown) used to connect the rear portions of the tunnel guard 700 to the heat exchanger 800 as will be described below. As such, the heat exchanger 800 can be used in the tunnel 18 described above. It is contemplated that the heat exchanger 800 could have other differences with the heat exchanger 100.

The tunnel guard 700 has a pair of arms 702 with a cross-member 704 extending therebetween. As can be seen in the FIGS. 25 to 28, the arms 702 extend forward of the cross-member 704. The cross-member has a central portion 238 and a tongue 240 similar to those of the tunnel guard 200. The cross-member 704 is connected to the arms 702 in a manner similar to the one used to connect the cross-member 204 to the arms 202 of the tunnel guard 200, but the left and right ends of the cross-member 704 are opened at their fronts to permit the passage of the arms 702 therethrough. The rear portion of each arm 702 has a raised portion 710 defining an aperture 718 through which a rivet (not shown) is inserted to connect the rear portion of the arm 702 to the heat exchanger 800.

Figure 27:
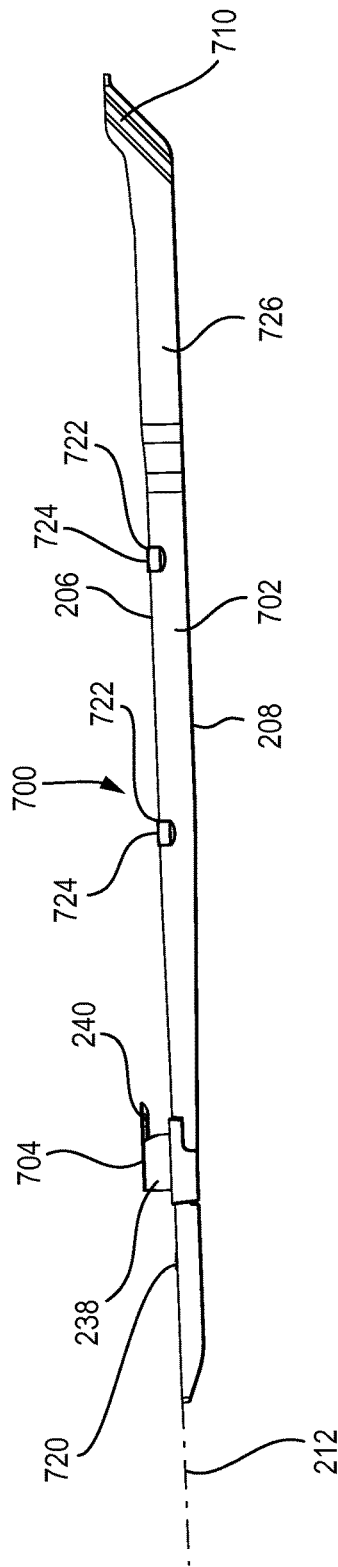
FIG. 27 is a left side elevation view of the tunnel guard of FIG. 26.
Figure 28:
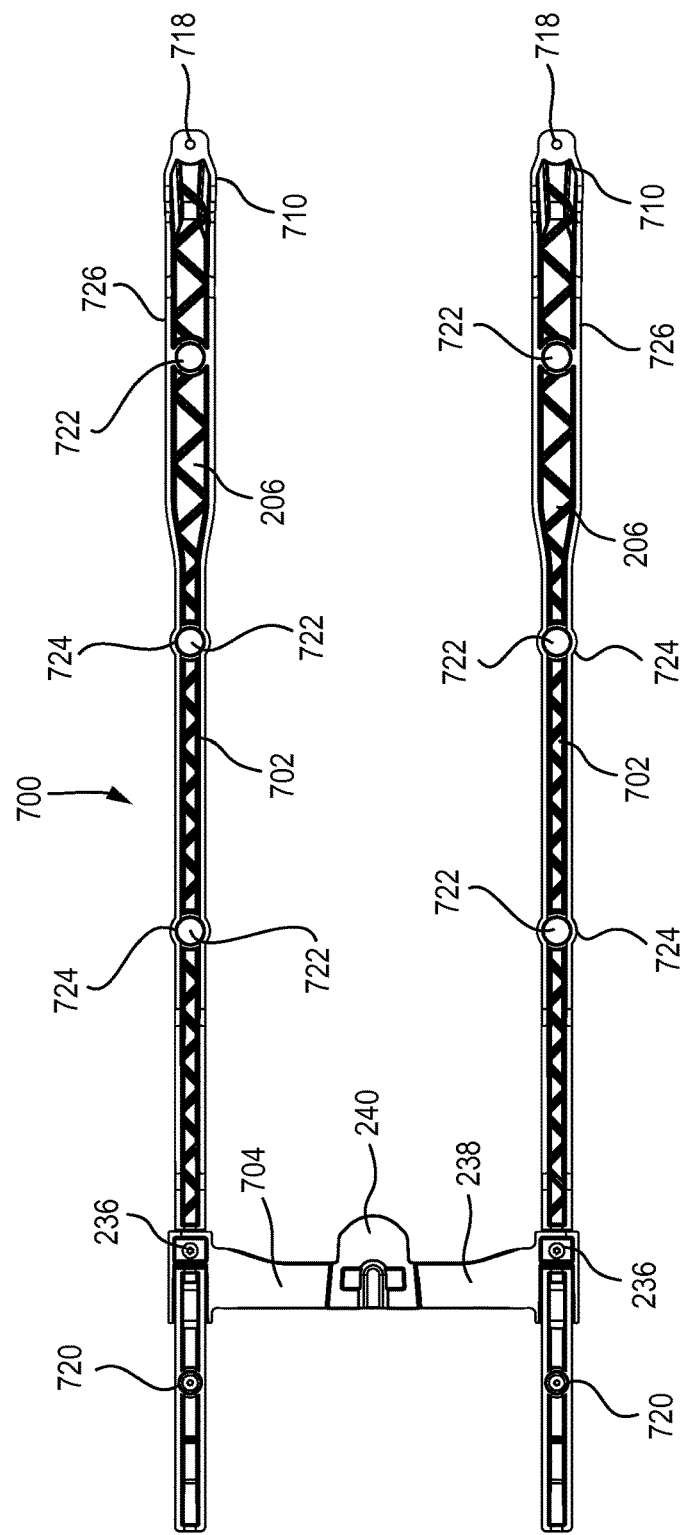
FIG. 28 is top plan view of the tunnel guard of FIG. 26.
Figure 29:
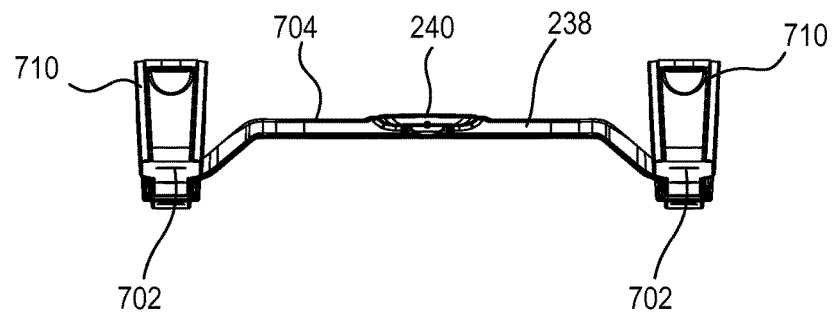
FIG. 29 is a rear elevation view of the tunnel guard of FIG. 26.

Each arm 702 is provided on a top thereof with a damper 720 in front of the cross-member 704 and three dampers 722 behind the cross-member 704. The dampers 720, 722 are received in corresponding recesses in the arms 702 and extend slightly above the top surfaces (i.e. plane 212) of the arms 702 as best seen in FIG. 27. The dampers 720 have a smaller diameter than the dampers 722. The dampers 720 are narrower than the front portion of the arms 702 in which they are received. The two front dampers 722 of each arm 702 are received in recesses formed in bulges 724 formed by the arm 702. The rear damper 722 of each arm 702 is received in a recess formed in a wider rear portion 726 of the arm 702 that is wider than the rear damper 722. In the present implementation, the dampers 720, 722 are circular in shape (as viewed from above), but other shapes are contemplated, such as, but not limited to, oval, square and rectangular. The dampers 720, 722 are made of rubber, but other vibration dampening materials are contemplated. It is contemplated that the arms 702 could have more or less dampers 720, 722 than illustrated. It is also contemplated that the tunnel guards 200, 300 and 500 could be provided with dampers similar to the dampers 720, 722. When the tunnel guard 700 is connected to the heat exchanger 800, the dampers 720, 722 abut the bottom of the heat exchanger 800 to reduce the transmission of vibrations between the tunnel guard 700 and the heat exchanger 800 and thereby potential rattling noises. The dampers 720, 722 also help to reduce wear of the heat exchanger 800 and the arms 702 that would otherwise occur from a direct contact between the heat exchanger 800 and the arms 702.

To connect the tunnel guard 700 to the bottom of the heat exchanger 800, and therefore to its corresponding tunnel 18, the tongue 240 is first inserted into the groove 132 defined by the lip 130. The apertures 718 are then aligned with corresponding apertures in the heat exchanger 800. Rivets (not shown) are then inserted through the apertures 718 and the corresponding apertures in the heat exchanger 800 to connect the rear portions of the arms 702 to the heat exchanger 800.

During operation of the snowmobile 10, should the drive track 30 move toward the bottom of the tunnel 18, the external lugs 78 come into contact with the arms 702 before they, or the studs 82, 83, can come in contact with the bottom of the heat exchanger 800. The arms 702 are sufficiently thick that, even though the studs 82 are taller than the external lugs 78 and the studs 83 protrude from the ends of the external lugs 78, when the external lugs 78 contact the arm 202 the studs 82, 83 are still spaced from the bottom of the tunnel 18. As the central portion 238 of the cross-member 704 is vertically spaced from the bottom surface 208 of the arms 702, the studs 82, 83 will not contact the central portion 238 of the cross-member 704 as the track 30 turns during operation of the snowmobile 10.

It is contemplated that in the tunnel guards 200, 300, 500 and 700 described above, the corresponding cross-member could be disposed elsewhere along a length of the corresponding arms.

Figure 30:
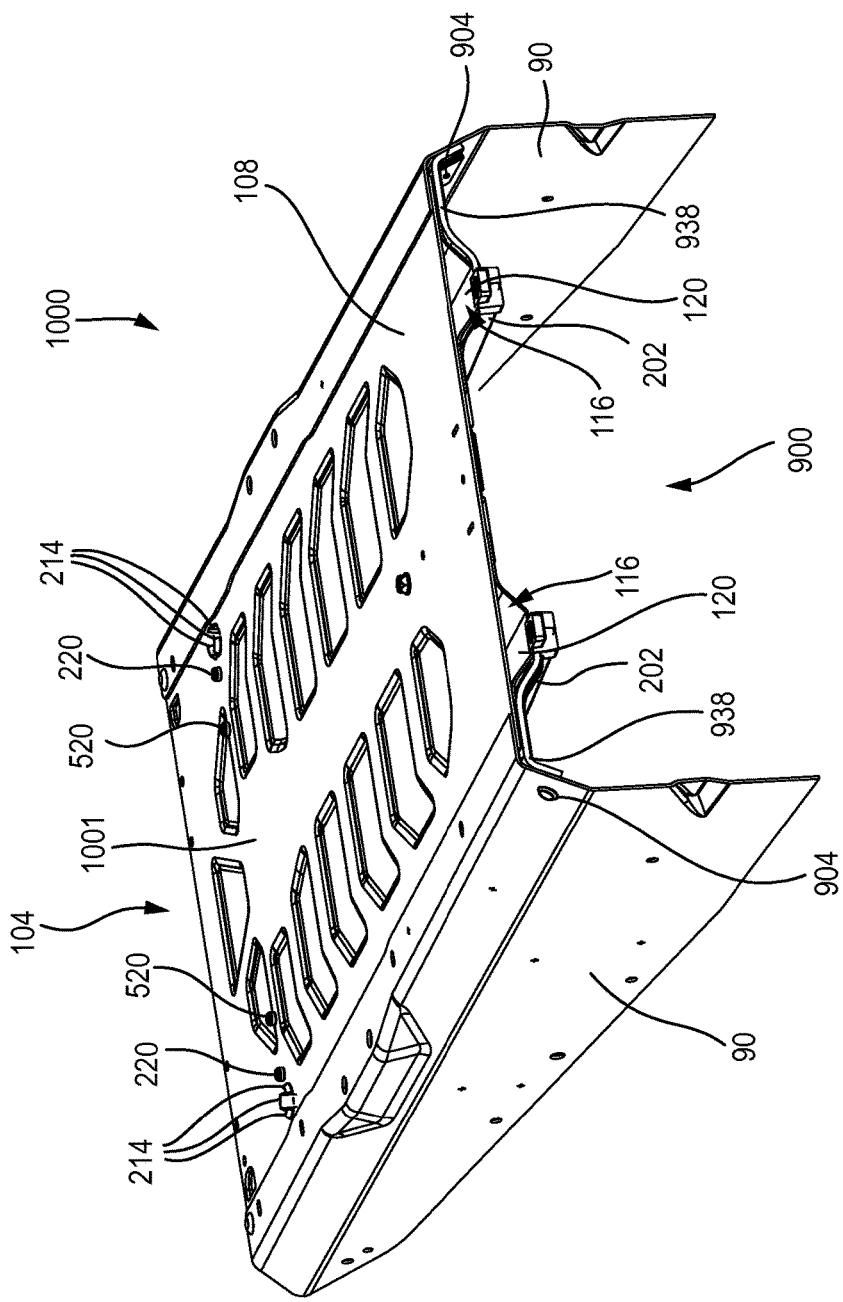
FIG. 30 is perspective view taken from a front, right side of a cross-section of alternative implementations of a tunnel and a tunnel guard of the snowmobile of FIG. 1, with the cross-section being taken laterally through side members of the tunnel guard.
Figure 31:
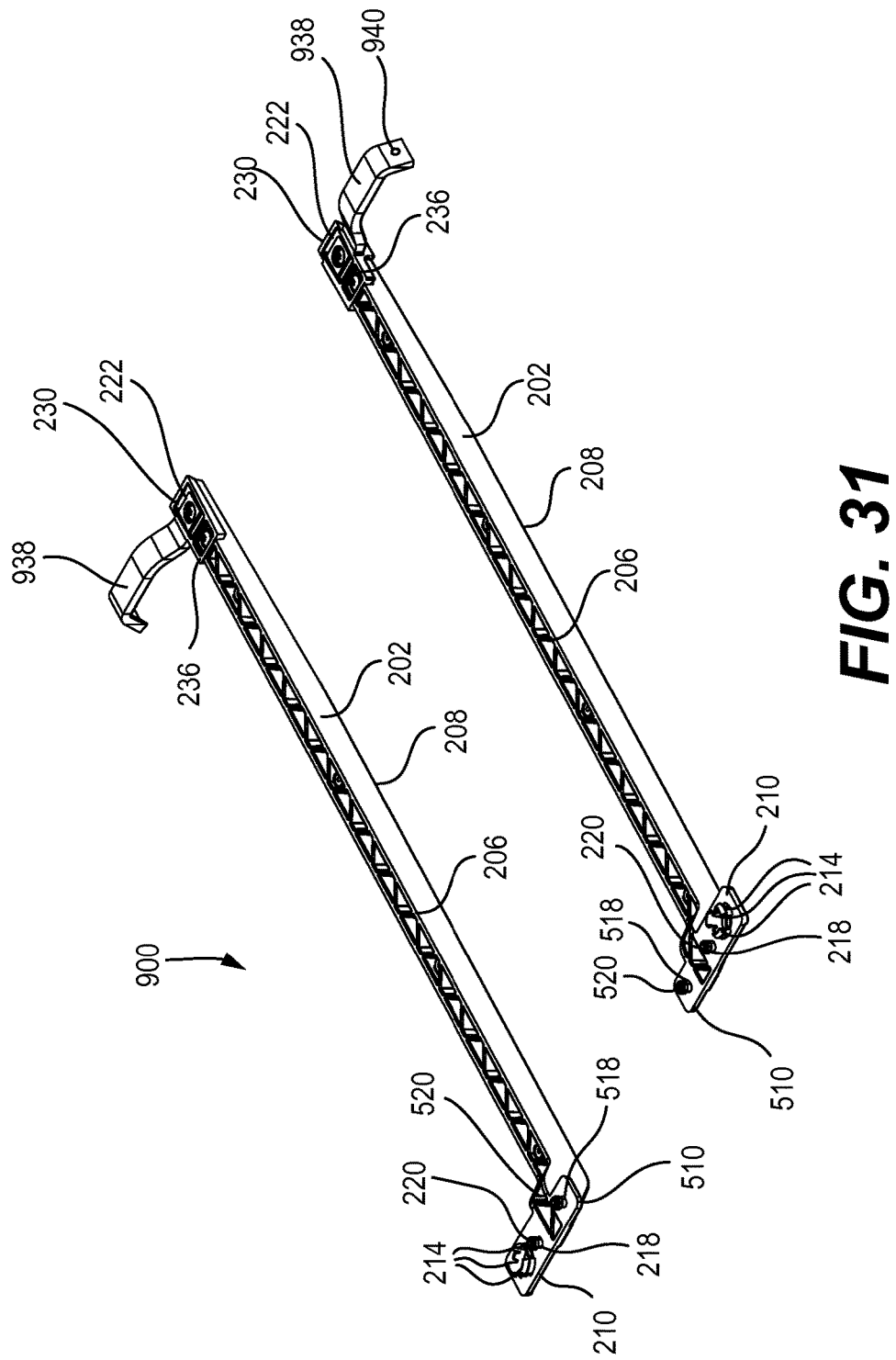
FIG. 31 is a perspective view taken from a rear, right side of the tunnel guard of FIG. 30.

Turning now to FIGS. 30 and 31, a tunnel guard 900 and a tunnel 1000 having a heat exchanger 1001, which are alternative implementations of the tunnel guard 500 and the tunnel 600 having the heat exchanger 601 described above, will be described. For simplicity, components and features of the tunnel guard 900, the tunnel 1000 and of the heat exchanger 1001 that are similar to those described above with respect to the tunnel guard 500, the tunnel 600 and the heat exchanger 601 have been labeled with the same reference numerals and will not be described again below.

The tunnel guard 900 is configured to be connected to the interior of the tunnel 1000. The interior of the tunnel 1000 includes the surfaces of the tunnel 1000 that face the drive track 30. These surfaces include the bottom of the heat exchanger 1001, the right side of the left side portion 90 of the tunnel 1000 and the left side of the right side portion 90 of the tunnel 1000. In the present implementation, the tunnel 1000 corresponds to the tunnel 600 except that it has the heat exchanger 1001 instead of the heat exchanger 601 and that the side portions 90 have additional apertures as described below. The heat exchanger 1001 is similar to the heat exchange 601 except that the heat exchanger 1001 does not have a lip 130 and does not have apertures used to connect the front of the tunnel guard 900. The side portions 90 of the tunnel 1000 are provided with apertures (not shown) to receive rivets 904 used to connect the front portion of the tunnel guard 900 to the interior of the tunnel 1000. It is contemplated that the heat exchanger 1001 could have other differences with the heat exchanger 601.

In the present implementation, the tunnel guard 900 is similar to the tunnel guard 500 except that it does not have the central portion 238, and therefore the tongue 240, of the cross-member 504. As such, the tunnel guard 900 does not have a cross-member connecting the two arms 202 together. The tunnel guard 900 has two side members 938 that are similar to the side portions 538 of the cross-member 504. Each side member 938 is connected to a front of its corresponding arm 202 and extends laterally outward of this arm 202. It is contemplated that the side members 938 could extend laterally inward from their respective arms 202. It is also contemplated that each arm 202 could be provided with a laterally inwardly extending side member in addition to the laterally outwardly extending side member 938. The side members 938 are spaced vertically above the portion of the bottom surface 208 of the arms 202 that is longitudinally aligned with the side members 938. In the present implementation, the side members 938 are spaced vertically above the plane 212 (not shown in the present implementation, but corresponding to the plane 212 shown in FIG. 22). It is contemplated that the side members 938 could be lower than illustrated as long as they are sufficiently vertically spaced above the bottom surface 208 of the arms 202 so as not to interfere with the studs 83 as will be described below. The side members 938 define apertures 940 for receiving the rivets 904 (FIG. 30) used to connect the tunnel guard 900 to the interior of the tunnel 1000 as described below. It is contemplated that the apertures 940 could be defined elsewhere in the side members 938 so as to connect the tunnel guard 900 to the heat exchanger 1001 only or to the heat exchanger 1001 and the side portions 90 of the tunnel 1000 similarly to the implementation shown in FIG. 20. The rear portions of the arms 202 are the same as in the tunnel guard 500. It is also contemplated that a type of connection element that differs from the ones described above could be used to connect the arms 202 to the tunnel 1000.

To connect the tunnel guard 900 to the interior of the tunnel 1000, the tabs 214 are inserted through their corresponding apertures in the heat exchanger 1001. The rivets 220 are then inserted through the apertures 218 and the corresponding apertures in the heat exchanger 1001. The rivets 520 are then inserted through the apertures 518 and the corresponding apertures in the heat exchanger 1001. Finally, the rivets 904 are inserted through the apertures 940 in the side member 938 and the corresponding apertures in the side portions 90 of the tunnel 1000. It is contemplated that the rivets 220, 520, 904 can be inserted in any order. It is contemplated that the side member 938 could alternatively or additionally be received inside grooves formed by lips provided on the heat exchanger 1001 in a manner similar to which the tongue 240 is received in the groove 132 in the above implementations.

During operation of the snowmobile 10, should the drive track 30 move toward the bottom of the tunnel 1000, the external lugs 78 come into contact with the arms 202 before they, or the studs 82, 83, can come in contact with the bottom of the tunnel 1000. The arms 202 are sufficiently thick that, even though the studs 82 are taller than the external lugs 78 and the studs 83 protrude from the ends of the external lugs 78, when the external lugs 78 contact the arm 202 the studs 82, 83 are still spaced from the bottom of the tunnel 1000. As the side members 938 are vertically spaced from the bottom surface 208 of the arms 202, the studs 83 that are laterally outward of the arms 202 (see FIG. 15) will not contact the side members 938 as the track 30 turns during operation of the snowmobile 10.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A tunnel guard for a tunnel of a snowmobile comprising:
   a first arm having a first end portion and a second end portion, the first end portion having a first connection element configured for connecting the first end portion of the first arm to an interior of the tunnel;
   a second arm having a first end portion and a second end portion, the first end portion having a second connection element configured for connecting the first end portion of the second arm to the interior of the tunnel; and
   at least one member extending from at least one of the first and second arms and connected to the at least one of the first and second arms, the at least one member having a third connection element for connecting the at least one member to the interior of the tunnel,
   the third connection element being disposed at a position that is one of:
      laterally between the first and second arms, and
      laterally outward of the at least one of the first and second arms.

2. The tunnel guard of claim 1, wherein the at least one member is a cross-member extending between the first and second arms and connected to the first and second arms.

3. The tunnel guard of claim 2, wherein a portion of the cross-member having the third connection element is spaced from bottom surfaces of the first and second arms.

4. The tunnel guard of claim 3, wherein the portion of the cross-member having the third connection element is spaced from a plane containing top surfaces of the second end portions of the first and second arms.

5. The tunnel guard of claim 2, wherein the third connection element is disposed laterally between the first and second arms.

6. The tunnel guard of claim 5, wherein the third connection element is a tongue configured to be received in a groove formed by the tunnel.

7. The tunnel guard of claim 6, wherein the tongue extends toward the first end portions of the first and second arms.

8. The tunnel guard of claim 6, wherein the tongue is centered laterally between the first and second arms.

9. The tunnel guard of claim 2, wherein:
   the first arm is parallel to the second arm; and
   the cross-member is perpendicular to the first and second arms.

10. The tunnel guard of claim 1, wherein the first portions of the first and second arms are rear end portions.

11. A snowmobile comprising:
    a frame having a tunnel, at least a portion of the tunnel being formed by a heat exchanger assembly adapted to have a motor fluid flowing therethrough for cooling the motor fluid, the heat exchanger assembly comprising:
       a top part; and
       a bottom part disposed below the top part and being joined to the top part,
       the bottom part defining a recess, the top and bottom parts defining therebetween a passage formed in part by the recess, the motor fluid flowing through the passage;
    a motor supported by the frame,
    the passage having an inlet fluidly connected to the motor for receiving the motor fluid from the motor,
    the passage having an outlet for returning the motor fluid to the motor,
    the motor fluid flowing from the motor into the passage via the inlet, through the passage, and back to the motor via the outlet;
    at least one ski connected to the frame;
    a rear suspension assembly connected to the tunnel;
    a drive track disposed around the rear suspension assembly and at least in part below the tunnel, the drive track being operatively connected to the motor; and
    a tunnel guard connected to an interior of the tunnel and being disposed between the drive track and the tunnel, the tunnel guard being disposed at least in part under the passage of the heat exchanger assembly; wherein:
       the passage has a right passage portion extending longitudinally along a right side of the tunnel and a left passage portion extending longitudinally along a left side of the tunnel; and the tunnel guard comprises: a right arm extending at least in part along the right passage portion, the right arm having a rear end portion and a front end portion, the rear end portion having a right connection element connected to the interior of the tunnel; a left arm extending at least in part along the left passage portion, the left arm having a rear end portion and a front end portion, the rear end portion having a left connection element connected to the interior of the tunnel; and at least one member extending from at least one of the right and left arms and connected to the at least one of the right and left arms, the at least one member having a connection element for connecting the at least one member to the interior of the tunnel, the connection element being disposed at a position that is one of: laterally between the right and left passage portions, and laterally outward of the at least one of the right and left passage portions.

12. The snowmobile of claim 11, wherein the at least one member is a cross-member extending between the first and second arms and connected to the first and second arms.

13. The snowmobile of claim 12, wherein:
    the right arm is parallel to the left arm; and
    the cross-member is perpendicular to the right and left arms.

14. The snowmobile of claim 12, wherein a portion of the cross-member having the connection element is vertically higher than bottom surfaces of the first and second arms.

15. The snowmobile of claim 14, wherein the portion of the cross-member having the connection element is vertically higher than the front end portions of the right and left arms.

16. The snowmobile of claim 12, wherein the connection element is a central connection element disposed laterally between the right and left passage portions.

17. The snowmobile of claim 16, wherein:
the central connection element is a tongue extending rearward;
the tunnel defines a groove laterally between the right and left passage portions; and
the tongue is received in the groove.

18. The snowmobile of claim 11, wherein:
the drive track comprises:
a belt; and
a plurality of external lugs distributed on an outer side of the belt,
at least some of the plurality of external lugs forming a right longitudinal row of lugs and a left longitudinal row of lugs;
the right arm of the tunnel guard is laterally aligned with at least a portion of the right longitudinal row of lugs; and
the left arm of the tunnel guard is laterally aligned with at least a portion of the left longitudinal row of lugs.

19. The snowmobile of claim 18, wherein the drive track further comprises a plurality of studs distributed on at least one of an outer side of the belt and at least some of the plurality of external lugs,
at least some of the plurality of studs being disposed laterally between the right and left arms.

20. A method for connecting a tunnel guard to an interior of a tunnel of a snowmobile, the tunnel guard having a rearwardly extending tongue, and the tunnel having a groove opening forwardly, the method comprising:
connecting a front portion of the tunnel guard to the interior of the tunnel by sliding the front portion of the tunnel guard in a connected position, connecting the front portion of the tunnel guard to the interior of the tunnel including moving the tunnel guard rearward to insert the tongue in the groove;
after connecting the front portion of the tunnel guard and while maintaining the tunnel guard in the connected position, connecting the rear portion of the tunnel guard to the interior of the tunnel thereby preventing longitudinal movement of the front portion of the tunnel guard, the front portion of the tunnel guard being connectable to the interior of the tunnel only by being connected to the interior of the tunnel prior to the rear portion of the tunnel guard.

21. The method of claim 20, wherein:
the tunnel has a heat exchanger;
the heat exchanger has a passage for motor fluid;
the passage has a right passage portion and a left passage portion;
connecting the front portion of the tunnel guard to the interior of the tunnel includes connecting the front portion of the tunnel guard to the tunnel at a position laterally between the right and left passage portions.

22. The method of claim 20, wherein portions of the tunnel guard between the front and rear portions of the tunnel guard are free of direct connection to the interior of the tunnel.

23. A snowmobile comprising: a frame having a tunnel, at least a portion of the tunnel being formed by a heat exchanger assembly adapted to have a motor fluid flowing therethrough for cooling the motor fluid, the heat exchanger assembly comprising: a top part; and a bottom part disposed below the top part and being joined to the top part, the bottom part defining a recess, the top and bottom parts defining therebetween a passage formed in part by the recess, the motor fluid flowing through the passage; a motor supported by the frame, the passage having an inlet fluidly connected to the motor for receiving the motor fluid from the motor, the passage having an outlet for returning the motor fluid to the motor, the motor fluid flowing from the motor into the passage via the inlet, through the passage, and back to the motor via the outlet; at least one ski connected to the frame; a rear suspension assembly connected to the tunnel; a drive track disposed around the rear suspension assembly and at least in part below the tunnel, the drive track being operatively connected to the motor; and a tunnel guard connected to an interior of the tunnel and being disposed between the drive track and the tunnel, the tunnel guard being disposed at least in part under the passage of the heat exchanger assembly; wherein:
the tunnel guard is connected to the interior of the tunnel at a plurality of positions; and
at least one of the plurality of positions is longitudinally offset from the passage of the heat exchanger assembly.

* * * * *